US012625551B2

(12) United States Patent
Garcia et al.

(10) Patent No.: US 12,625,551 B2
(45) Date of Patent: May 12, 2026

(54) METHOD AND SYSTEM FOR PERFORMING EYE TRACKING IN AUGMENTED REALITY DEVICES

(71) Applicant: Magic Leap, Inc., Plantation, FL (US)

(72) Inventors: Giovanni Garcia, Plantation, FL (US); Christian Melo, Miami, FL (US); Daniel Farmer, Verdi, NV (US); Jason Allen Shultz, Waxhaw, NC (US); Bach Nguyen, Coral Spring, FL (US); Charles Robert Schabacker, Plantation, FL (US); Michael Shoaee, Fort Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/983,134

(22) Filed: Dec. 16, 2024

(65) Prior Publication Data

US 2025/0117082 A1     Apr. 10, 2025

Related U.S. Application Data

(63) Continuation of application No. PCT/US2023/025584, filed on Jun. 16, 2023.
(Continued)

(51) Int. Cl.
    *G06F 3/01*        (2006.01)
    *G02B 27/01*      (2006.01)
    (Continued)

(52) U.S. Cl.
    CPC ......... *G06F 3/013* (2013.01); *G02B 27/0172* (2013.01); *H04N 23/56* (2023.01);
    (Continued)

(58) Field of Classification Search
    CPC ................ G06F 3/013; G02B 27/0172; G02B 2027/0138; G02B 2027/0178;
         (Continued)

(56) References Cited

U.S. PATENT DOCUMENTS

| | | | | |
|---|---|---|---|---|
| 9,600,069 B2 * | 3/2017 | Publicover | ............. | G06V 40/19 |
| 10,775,616 B1 * | 9/2020 | Ouderkirk | ............... | G06F 3/013 |

(Continued)

FOREIGN PATENT DOCUMENTS

| | | |
|---|---|---|
| WO | 2022232820 A1 | 11/2022 |
| WO | 2023244811 A1 | 12/2023 |

OTHER PUBLICATIONS

PCT/US2023/025584, "International Preliminary Report on Patentability", Dec. 26, 2024, 8 pages.
(Continued)

*Primary Examiner* — Dmitriy Bolotin
(74) *Attorney, Agent, or Firm* — KILPATRICK TOWNSEND & STOCKTON LLP

(57) ABSTRACT

A wearable device for projecting image light to an eye of a viewer and forming an image of virtual content in an augmented reality display is provided. The wearable device includes a projector and stack of waveguides optically connected to the projector. The wearable device also includes an eye tracking system comprising a plurality of illumination sources, an optical element having optical power, and a set of cameras. The optical element is disposed between the plurality of illumination sources and the set of cameras. In some embodiments, the augmented reality display includes an eyepiece operable to output virtual content from an output region and a plurality of illumination sources. At least some of the plurality of illumination sources overlap with the output region.

20 Claims, 18 Drawing Sheets

Related U.S. Application Data

(60) Provisional application No. 63/353,333, filed on Jun. 17, 2022.

(51) Int. Cl.
  *H04N 23/56* (2023.01)
  *H04N 23/90* (2023.01)

(52) U.S. Cl.
  CPC ..... *H04N 23/90* (2023.01); *G02B 2027/0138* (2013.01); *G02B 2027/0178* (2013.01)

(58) Field of Classification Search
  CPC ........ G02B 2027/0187; G02B 27/0093; H04N 23/56; H04N 23/90
  See application file for complete search history.

(56) References Cited

U.S. PATENT DOCUMENTS

| | | | |
|---|---|---|---|
| 10,877,268 B2 * | 12/2020 | Hatzilias | G02B 27/0093 |
| 10,942,349 B2 * | 3/2021 | Ouderkirk | G02B 27/0093 |
| 11,106,033 B2 | 8/2021 | Edwin et al. | |
| 2013/0114850 A1 * | 5/2013 | Publicover | A61B 3/0025 |
| | | | 382/103 |
| 2014/0168056 A1 | 6/2014 | Swaminathan et al. | |
| 2015/0248006 A1 | 9/2015 | Schowengerdt | |
| 2016/0274762 A1 * | 9/2016 | Lopez | G06T 19/006 |
| 2016/0357261 A1 | 12/2016 | Bristol et al. | |
| 2019/0361523 A1 * | 11/2019 | Sharma | G02B 27/0972 |
| 2020/0064627 A1 * | 2/2020 | Ouderkirk | G02B 27/0093 |
| 2020/0355929 A1 * | 11/2020 | Zhang | G02B 27/425 |
| 2021/0325677 A1 * | 10/2021 | Gao | G02B 27/0093 |
| 2024/0012244 A1 * | 1/2024 | Mutlu | G02B 27/0172 |
| 2024/0012246 A1 * | 1/2024 | Wu | H05K 1/0274 |

OTHER PUBLICATIONS

PCT/US2023/025584, "International Search Report and Written Opinion", Nov. 15, 2023, 13 pages.

PCT/US2023/025584, "Invitation to Pay Additional Fees And, Where Applicable, Protest Fee", Sep. 7, 2023, 2 pages.

* cited by examiner

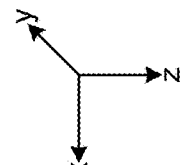
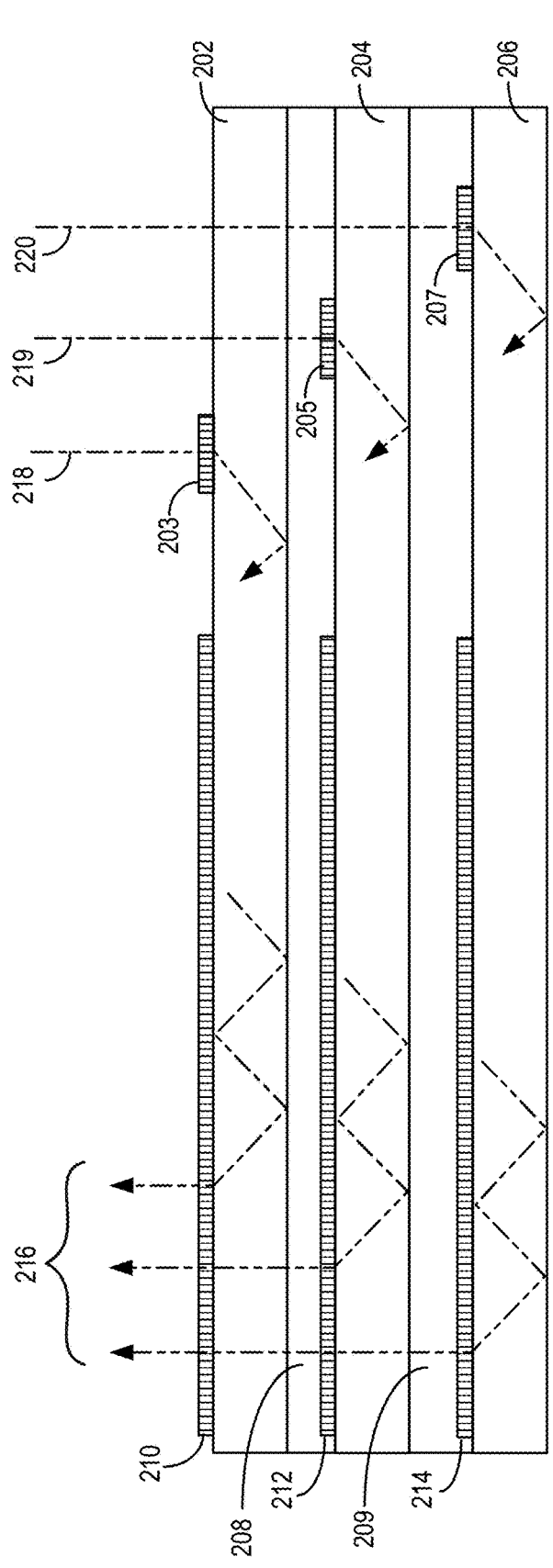
*FIG. 2A*

200

222, 224, 226

202, 204, 206

203  207

205

210, 212, 214

World Side

Eye Side

World Side

Eye Side

World Side

Eye Side

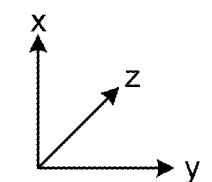
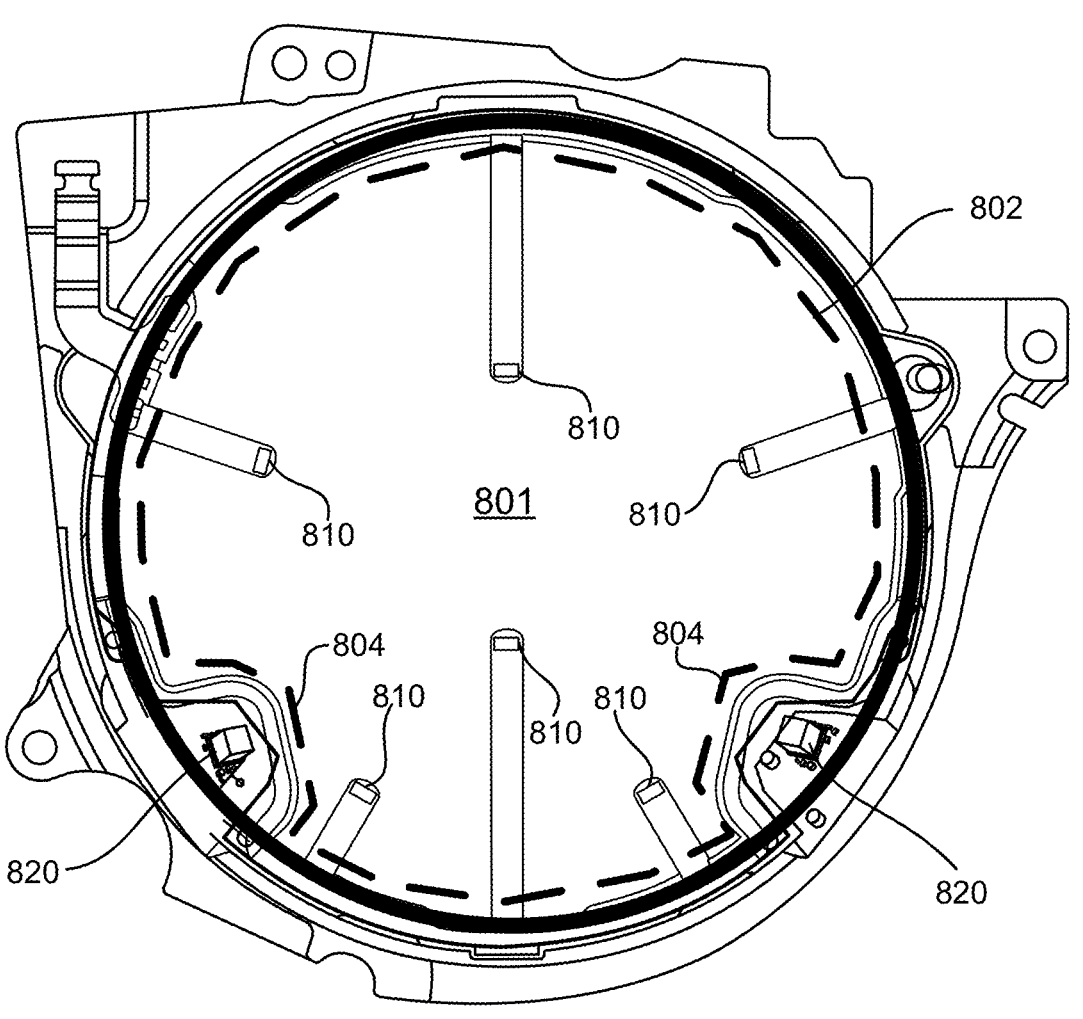
FIG. 8

FOV Cone Base

FOV Cone

1130

1110

1122

1120

1200

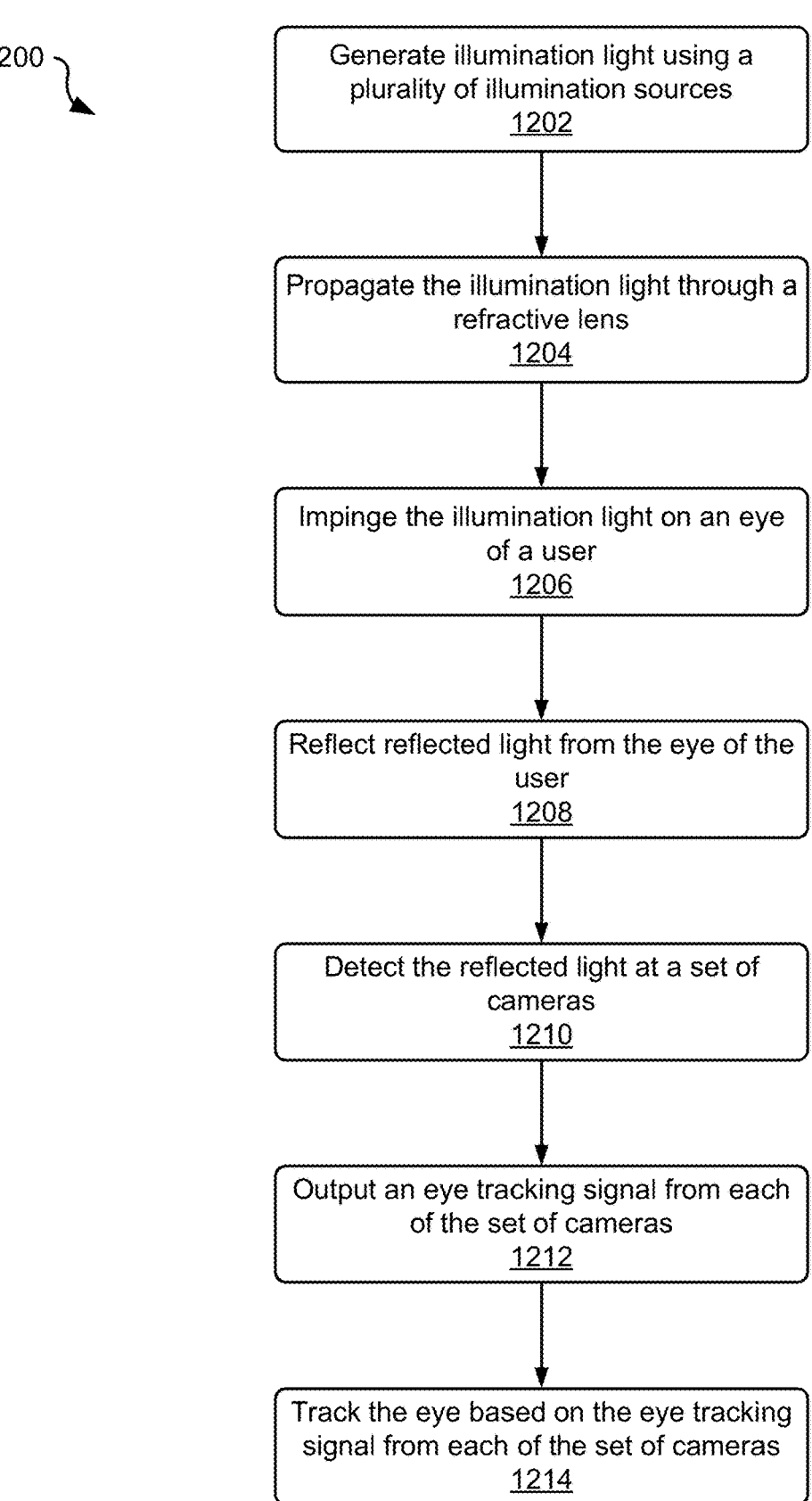

Generate illumination light using a
plurality of illumination sources
1202

Propagate the illumination light through a
refractive lens
1204

Impinge the illumination light on an eye
of a user
1206

Reflect reflected light from the eye of the
user
1208

Detect the reflected light at a set of
cameras
1210

Output an eye tracking signal from each
of the set of cameras
1212

Track the eye based on the eye tracking
signal from each of the set of cameras
1214

*FIG. 12*

METHOD AND SYSTEM FOR PERFORMING EYE TRACKING IN AUGMENTED REALITY DEVICES

CROSS-REFERENCES TO RELATED APPLICATIONS

This application is a continuation of International Patent Application No. PCT/US2023/025584, filed Jun. 16, 2023, entitled "METHOD AND SYSTEM FOR PERFORMING EYE TRACKING IN AUGMENTED REALITY DEVICES," which claims the benefit of and priority to U.S. Provisional Patent Application No. 63/353,333, filed on Jun. 17, 2022, entitled "METHOD AND SYSTEM FOR PERFORMING EYE TRACKING IN AUGMENTED REALITY DEVICES," the disclosure of which is hereby incorporated by reference in its entirety for all purposes.

BACKGROUND OF THE INVENTION

Modern computing and display technologies have facilitated the development of systems for so called "virtual reality" or "augmented reality" experiences, wherein digitally reproduced images or portions thereof are presented to a viewer in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the viewer.

Despite the progress made in these display technologies, there is a need in the art for improved methods and systems related to eye tracking in augmented reality systems.

SUMMARY OF THE INVENTION

The present invention relates generally to methods and systems related to augmented reality systems. More particularly, embodiments of the present invention provide methods and systems for performing eye tracking in which eye tracking illumination sources are positioned within the field of view of the user of the augmented reality system. The invention is applicable to a variety of applications in computer vision and image display systems.

Various examples of the present disclosure are provided below. As used below, any reference to a series of examples is to be understood as a reference to each of those examples disjunctively (e.g., "Examples 1-4" is to be understood as "Examples 1, 2, 3, or 4").

Example 1 is an augmented reality display comprising: an eyepiece operable to output virtual content from an output region; and a plurality of illumination sources, wherein at least some of the plurality of illumination sources overlap with the output region.

Example 2 is the augmented reality display of example 1, wherein the eyepiece has a world side and an eye side opposing the world side and the plurality of illumination sources are disposed on the eye side of the eyepiece.

Example 3 is the augmented reality display of example(s) 1-2 further comprising a set of cameras disposed on the eye side.

Example 4 is the augmented reality display of example(s) 1-3, wherein the set of cameras are positioned farther from the eyepiece than the plurality of illumination sources Example 5 is the augmented reality display of example(s) 1-4, wherein the set of cameras are disposed within a width and a height of the output region.

Example 6 is the augmented reality display of example(s) 1-5, wherein the output region is disposed in a plane orthogonal to an optical axis and a projection of each of the plurality of illumination sources parallel to the optical axis is located within the output region.

Example 7 is the augmented reality display of example(s) 1-6, wherein the plurality of illumination sources are positioned at three different radial distances from the optical axis.

Example 8 is the augmented reality display of example(s) 1-7, wherein the virtual content is output by a diffractive structure in the eyepiece defined by a boundary and the one or more of the plurality of illumination sources are located above the boundary of the diffractive structure in plan view.

Example 9 is the augmented reality display of example(s) 1-8, wherein the plurality of illumination sources are disposed in a plane and virtual content passes through the plane at positions surrounding each of the plurality of illumination sources.

Example 10 is the augmented reality display of example(s) 1-9, wherein the positions surrounding each of the plurality of illumination sources are disposed at substantially 360° with respect to each of the plurality of illumination sources.

Example 11 is the augmented reality display of example(s) 1-10, wherein the plurality of illumination sources comprise a set of infrared light emitting diodes.

Example 12 is the augmented reality display of example(s) 1-11, further comprising an optical element having optical power, wherein the plurality of illumination sources are disposed between the optical element and the eyepiece.

Example 13 is the augmented reality display of example(s) 1-12, further comprising a set of cameras, wherein the optical element is disposed between the plurality of illumination sources and the set of cameras.

Example 14 is an eye tracking system including: a plurality of illumination sources; an optical element having optical power; and a set of cameras, wherein the optical element is disposed between the plurality of illumination sources and the set of cameras.

Example 15 is the eye tracking system of example 14, wherein the plurality of illumination sources comprises a set of infrared (IR) light emitting diodes (LEDs) disposed in a plane.

Example 16 is the eye tracking system of example(s) 14-15, wherein the plurality of illumination sources are disposed on a world side of the optical element.

Example 17 is the eye tracking system of example(s) 14-16, wherein the plurality of illumination sources are laminated between a substrate and a passivation coating.

Example 18 is the eye tracking system of example(s) 14-17, wherein the optical element comprises a planar surface and the substrate is bonded to the planar surface of the optical element.

Example 19 is the eye tracking system of example(s) 14-18, wherein the optical power is a negative optical power.

Example 20 is the eye tracking system of example(s) 14-19, further comprising an eyepiece operable to output virtual content over an output region, wherein the virtual content passes through a plane in which the plurality of illumination sources are disposed and then through the optical element before viewing by a user.

Example 21 is the eye tracking system of example(s) 14-20, wherein the set of cameras are adjacent to the user.

Example 22 is the eye tracking system of example(s) 14-21, wherein light from the plurality of illumination sources is configured to propagate through the optical element before reaching a user.

Example 23 is the eye tracking system of example(s) 14-22, wherein each of the plurality of illumination sources are mounted with an emission surface facing the optical element, wherein electrical contacts for each of the plurality of illumination sources are disposed between each of the plurality of illumination sources and the optical element.

Example 24 is a method of performing eye tracking, the method comprising: generating illumination light using a plurality of illumination sources; propagating the illumination light through a refractive lens; impinging the illumination light on an eye of a user; reflecting reflected light from the eye of the user; detecting the reflected light at a set of cameras; outputting an eye tracking signal from each of the set of cameras; and tracking the eye based on the eye tracking signal from each of the set of cameras.

Example 25 is the method of performing eye tracking of example 24, wherein the refractive lens has a negative optical power and world light passes through a corresponding refractive lens having positive optical power and the refractive lens to the eye.

Example 26 is the method of performing eye tracking of example(s) 24-25, wherein the plurality of illumination sources are disposed on a side of the refractive lens opposing the user.

Example 27 is the method of performing eye tracking of example(s) 24-26, wherein the refractive lens has a negative optical power.

Example 28 is the method of performing eye tracking of example(s) 24-27, further comprising: producing virtual content from an output region of an eyepiece; propagating the virtual content through a plane in which the plurality of illumination sources are disposed; and impinging the virtual content on the eye of the user.

Example 29 is a wearable device for projecting image light to an eye of a viewer for forming an image of virtual content, the wearable device comprising: a projector; a stack of waveguides optically connected to the projector; and an eye tracking system comprising: a plurality of illumination sources; an optical element having optical power; and a set of cameras, wherein the optical element is disposed between the plurality of illumination sources and the set of cameras.

Example 30 is a wearable device for projecting image light of example 29, wherein the plurality of illumination sources comprises a set of infrared (IR) light emitting diodes (LEDs) disposed in a plane.

Example 31 is a wearable device for projecting image light of example(s) 29-30, wherein the plurality of illumination sources are disposed on a world side of the optical element.

Example 32 is a wearable device for projecting image light of example(s) 29-31, wherein the plurality of illumination sources are laminated between a substrate and a passivation coating.

Example 33 is a wearable device for projecting image light of example(s) 29-32, wherein the optical element comprises a planar surface and the substrate is bonded to the planar surface of the optical element.

Example 34 is a wearable device for projecting image light of example(s) 29-33, wherein the optical power is a negative optical power.

Example 35 is a wearable device for projecting image light of example(s) 29-34, wherein the virtual content is output over an output region, wherein the virtual content passes through a plane in which the plurality of illumination sources are disposed and then through the optical element before viewing by a user.

Example 36 is a wearable device for projecting image light of example(s) 29-35, wherein the set of cameras are adjacent to the user.

Example 37 is a wearable device for projecting image light of example(s) 29-36, wherein light from the plurality of illumination sources is configured to propagate through the optical element before reaching a user.

Example 38 is a wearable device for projecting image light of example(s) 29-37, wherein each of the stack of waveguides is configured to propagate light in a respective wavelength range.

Example 39 is a wearable device for projecting image light of example(s) 29-38, wherein the plurality of illumination sources is electrically powered by metal traces.

Example 40 is a wearable device for projecting image light of example(s) 29-39, wherein each of the plurality of illumination sources comprises an emission surface that is coupled to a plurality of contacts, wherein the plurality of contacts is configured to partially block the emission surface.

Numerous benefits are achieved by way of the present invention over conventional techniques. For example, embodiments of the present invention provide methods and systems that can perform eye tracking for users of a broad range of demographics, anthropometry, and gaze angles. These and other embodiments of the invention along with many of its advantages and features are described in more detail in conjunction with the text below and attached figures.

BRIEF DESCRIPTION OF THE DRAWINGS

FIG. 2A illustrates a cross-sectional side view of an example of a set of stacked waveguides that each include an incoupling optical element.

FIG. 8 is a simplified plan view of an augmented reality display indicating the perimeter of the merged illumination and refractive layer structure of the eyepiece according to an embodiment of the present invention.

FIG. 12 is a flowchart of a method of performing eye tracking according to an embodiment of the present invention.

DETAILED DESCRIPTION OF SPECIFIC EMBODIMENTS

Eye tracking performance of a VR or AR device including an eyepiece is enhanced by positioning at least some of the illumination sources of the eye tracking system closer to an optical axis than to the periphery of an output region of the eyepiece. Thus, positioning of at least some of the illumination sources at locations in front of a user's eye, rather than to the side of the user's eye, improves eye tracking performance.

As described herein, embodiments of the present invention provide an eye tracking system that includes four dedicated eye cameras (e.g., two cameras per eye) that are positioned in front of, for example, directly in front of, a user's eyes. A plurality of illumination sources e.g., infrared (IR) light emitting diodes (LEDs) illuminate the eye with infrared light. As a result, the eye tracking cameras capture images that include the eye as well as reflected light produced by the plurality of illumination sources after reflection from the user's eye. Using these images, embodiments of the present invention utilize various software algorithms to determine eye orientation metrics, including the center of eye rotation, interpupillary distance, pupil diameter, gaze angle, and the like.

Figure 1:
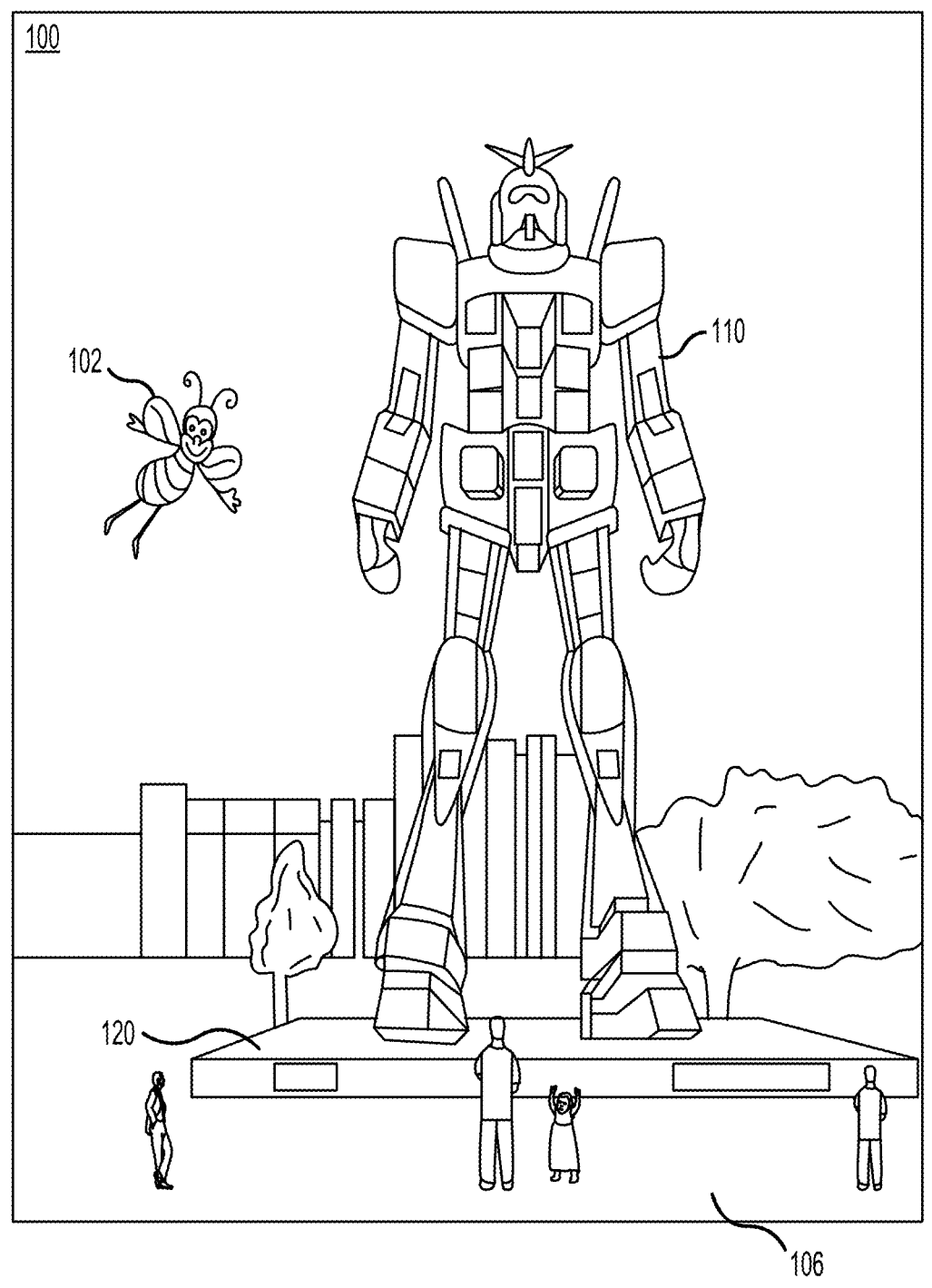
FIG. 1 illustrates a user's view of augmented reality (AR) through an AR device.

FIG. 1 illustrates a user's view of augmented reality (AR) through an AR device. Referring to FIG. 1, an augmented reality scene 100 is depicted wherein a user of an AR technology sees a real-world park-like setting 106 featuring people, trees, buildings in the background, and a concrete platform 120. In addition to these items, the user of the AR technology also perceives that he "sees" a robot statue (110) standing upon the real-world platform (120), and a cartoon-like avatar character (102) flying by, which seems to be a personification of a bumble bee, even though these elements (102, 110) do not exist in the real world. Due to the extreme complexity of the human visual perception and nervous system, it is challenging to produce a VR or AR technology that facilitates a comfortable, natural-feeling, rich presentation of virtual image elements amongst other virtual or real-world imagery elements.

FIG. 2A illustrates a cross-sectional side view of an example of a set of stacked waveguides that each include an incoupling optical element. As illustrated by FIG. 2A, in some embodiments, light impinging on a waveguide may need to be redirected to incouple that light into the waveguide. An incoupling optical element may be used to redirect and in-couple the light into its corresponding waveguide. Although referred to as "incoupling optical element" through the specification, the incoupling optical element need not be an optical element and may be a non-optical element. FIG. 2A illustrates a cross-sectional side view of an example of a set 200 of stacked waveguides that each includes an incoupling optical element. The waveguides may each be configured to output light of one or more different wavelengths, or one or more different ranges of wavelengths. Light from a projector is injected into the set 200 of stacked waveguides and outcoupled to a user as described more fully below.

The illustrated set 200 of stacked waveguides includes waveguides 202, 204, and 206. Each waveguide includes an associated incoupling optical element (which may also be referred to as a light input area on the waveguide), with, e.g., incoupling optical element 203 disposed on a major surface (e.g., an upper major surface) of waveguide 202, incoupling optical element 205 disposed on a major surface (e.g., an upper major surface) of waveguide 204, and incoupling optical element 207 disposed on a major surface (e.g., an upper major surface) of waveguide 206. In some embodiments, one or more of the incoupling optical elements 203, 205, 207 may be disposed on the bottom major surface of the respective waveguides 202, 204, 206 (particularly where the one or more incoupling optical elements are reflective, deflecting optical elements). As illustrated, the incoupling optical elements 203, 205, 207 may be disposed on the upper major surface of their respective waveguide 202, 204, 206 (or the top of the next lower waveguide), particularly where those incoupling optical elements are transmissive, deflecting optical elements. In some embodiments, the incoupling optical elements 203, 205, 207 may be disposed in the body of the respective waveguide 202, 204, 206. In some embodiments, as discussed herein, the incoupling optical elements 203, 205, 207 are wavelength-selective, such that they selectively redirect one or more wavelengths of light, while transmitting other wavelengths of light. While illustrated on one side or corner of their respective waveguides 202, 204, 206, it will be appreciated that the incoupling optical elements 203, 205, 207 may be disposed in other areas of their respective waveguides 202, 204, 206 in some embodiments.

As illustrated in FIG. 2A, the incoupling optical elements 203, 205, 207 may be laterally offset from one another. In some embodiments, each incoupling optical element may be offset such that it receives light without that light passing through another incoupling optical element. For example, each incoupling optical element 203, 205, 207 may be configured to receive light from a different projector and may be separated (e.g., laterally spaced apart) from other incoupling optical elements 203, 205, 207 such that it substantially does not receive light from the other ones of the incoupling optical elements 203, 205, 207.

Each waveguide also includes associated light distributing elements, with, e.g., light distributing elements 210 disposed on a major surface (e.g., a top major surface) of waveguide 202, light distributing elements 212 disposed on a major surface (e.g., a top major surface) of waveguide 204, and light distributing elements 214 disposed on a major surface (e.g., a top major surface) of waveguide 206. In some other embodiments, the light distributing elements 210, 212, 214 may be disposed on a bottom major surface of associated waveguides 202, 204, 206, respectively. In some other embodiments, the light distributing elements 210, 212,

214 may be disposed on both top and bottom major surfaces of associated waveguides 202, 204, 206, respectively; or the light distributing elements 210, 212, 214 may be disposed on different ones of the top and bottom major surfaces in different associated waveguides 202, 204, 206, respectively.

The waveguides 202, 204, 206 may be spaced apart and separated by, e.g., gas, liquid, and/or solid layers of material. For example, as illustrated, layer 208 may separate waveguides 202 and 204; and layer 209 may separate waveguides 204 and 206. In some embodiments, the layers 208 and 209 are formed of low refractive index materials (that is, materials having a lower refractive index than the material forming the immediately adjacent one of waveguides 202, 204, 206). Preferably, the refractive index of the material forming the layers 208, 209 is 0.05 or more, or 0.10 or less than the refractive index of the material forming the waveguides 202, 204, 206. Advantageously, the lower refractive index layers 208, 209 may function as cladding layers that facilitate total internal reflection (TIR) of light through the waveguides 202, 204, 206 (e.g., TIR between the top and bottom major surfaces of each waveguide). In some embodiments, the layers 208, 209 are formed of air. While not illustrated, it will be appreciated that the top and bottom of the illustrated set 200 of waveguides may include immediately neighboring cladding layers.

Preferably, for ease of manufacturing and other considerations, the material forming the waveguides 202, 204, 206 are similar or the same, and the material forming the layers 208, 209 are similar or the same. In some embodiments, the material forming the waveguides 202, 204, 206 may be different between one or more waveguides, and/or the material forming the layers 208, 209 may be different, while still holding to the various refractive index relationships noted above.

With continued reference to FIG. 2A, light rays 218, 219, 220 are incident on the set 200 of waveguides. It will be appreciated that the light rays 218, 219, 220 may be injected into the waveguides 202, 204, 206 by one or more projectors (not shown).

In some embodiments, the light rays 218, 219, 220 have different properties, e.g., different wavelengths or different ranges of wavelengths, which may correspond to different colors. The incoupling optical elements 203, 205, 207 each deflect the incident light such that the light propagates through a respective one of the waveguides 202, 204, 206 by TIR. In some embodiments, the incoupling optical elements 203, 205, 207 each selectively deflect one or more particular wavelengths of light, while transmitting other wavelengths to an underlying waveguide and associated incoupling optical element.

For example, incoupling optical element 203 may be configured to deflect ray 218, which has a first wavelength or range of wavelengths, while transmitting light rays 219 and 220, which have different second and third wavelengths or ranges of wavelengths, respectively. The transmitted ray 219 impinges on and is deflected by the incoupling optical element 205, which is configured to deflect light of a second wavelength or range of wavelengths. The light ray 220 is deflected by the incoupling optical element 207, which is configured to selectively deflect light of third wavelength or range of wavelengths.

With continued reference to FIG. 2A, the deflected light rays 218, 219, 220 are deflected so that they propagate through a corresponding waveguide 202, 204, 206; that is, the incoupling optical elements 203, 205, 207 of each waveguide deflects light into that corresponding waveguide 202, 204, 206 to in-couple light into that corresponding waveguide. The light rays 218, 219, 220 are deflected at angles that cause the light to propagate through the respective waveguide 202, 204, 206 by TIR. The light rays 218, 219, 220 propagate through the respective waveguide 202, 204, 206 by TIR until impinging on the waveguide's corresponding light distributing elements 210, 212, 214, where they are outcoupled to provide out-coupled light rays 216.

Figure 2B:
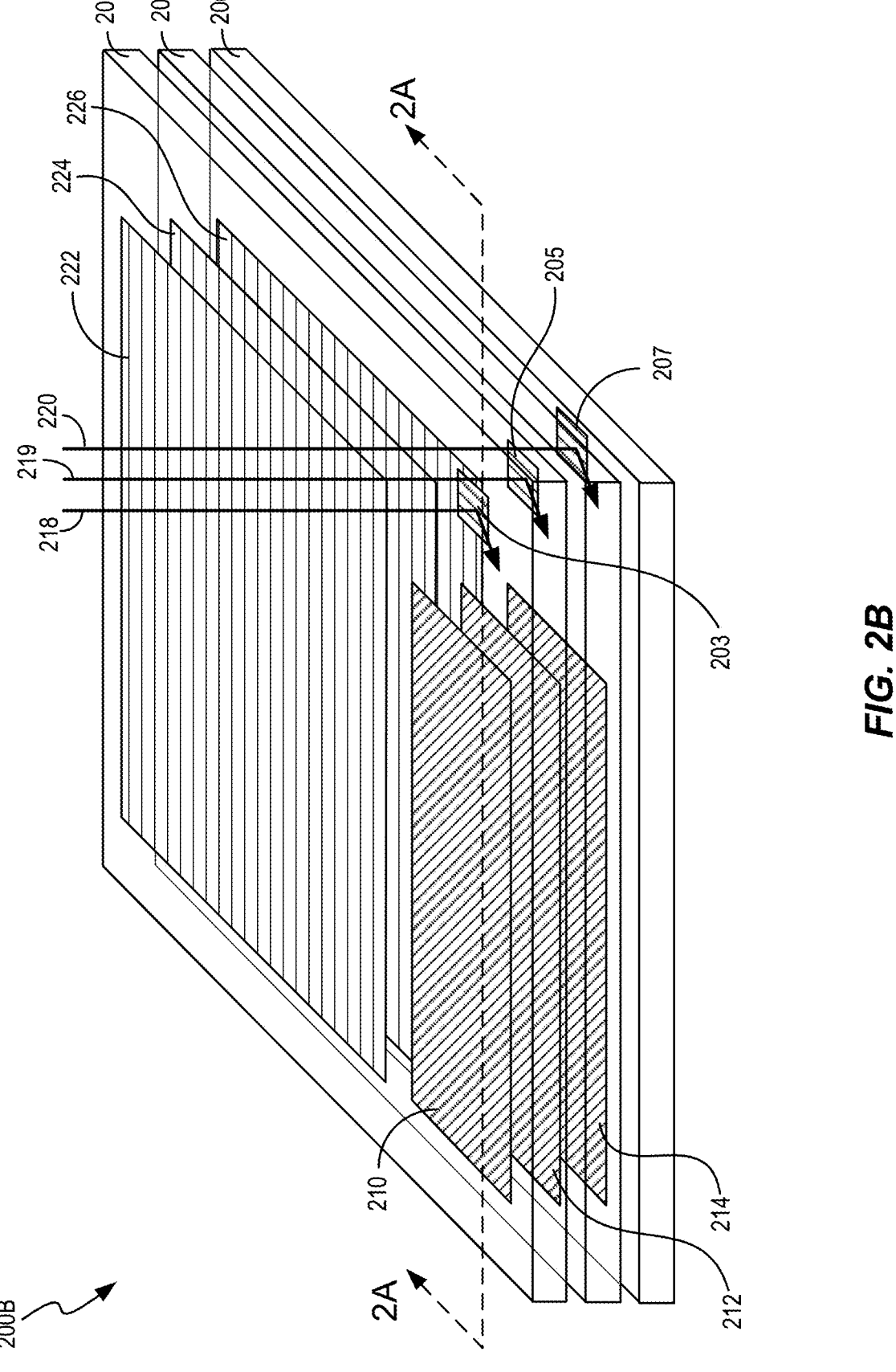
FIG. 2B illustrates a perspective view of an example of the one or more stacked waveguides of FIG. 2A.

FIG. 2B illustrates a perspective view of an example of the one or more stacked waveguides of FIG. 2A. With reference now to FIG. 2B, a perspective view of an example of the stacked waveguides of FIG. 2A is illustrated. As noted above, the in-coupled light rays 218, 219, 220, are deflected by the incoupling optical elements 203, 205, 207, respectively, and then propagate by TIR within the waveguides 202, 204, 206, respectively. The light rays 218, 219, 220 then impinge on the light distributing elements 210, 212, 214, respectively. The light distributing elements 210, 212, 214 deflect the light rays 218, 219, 220 so that they propagate towards the outcoupling optical elements 222, 224, 226, respectively.

In some embodiments, the light distributing elements 210, 212, 214 are orthogonal pupil expanders (OPEs). In some embodiments, the OPEs deflect or distribute light to the outcoupling optical elements 222, 224, 226 and, in some embodiments, may also increase the beam or spot size of this light as it propagates to the outcoupling optical elements. In some embodiments, the light distributing elements 210, 212, 214 may be omitted and the incoupling optical elements 203, 205, 207 may be configured to deflect light directly to the outcoupling optical elements 222, 224, 226. For example, with reference to FIG. 2A, the light distributing elements 210, 212, 214 may be replaced with outcoupling optical elements 222, 224, 226, respectively. In some embodiments, the outcoupling optical elements 222, 224, 226 are exit pupils (EPs) or exit pupil expanders (EPEs) that direct light to the eye of the user. It will be appreciated that the OPEs may be configured to increase the dimensions of the eye box in at least one axis and the EPEs may be configured to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EPE again, at which time another portion of the impinging light is directed out of the waveguide, and so on. Consequently, a single beam of in-coupled light may be "replicated" each time a portion of that light is redirected by an OPE or EPE, thereby forming a field of cloned beams of light. In some embodiments, the OPE and/or EPE may be configured to modify a size of the beams of light. In some embodiments, the functionality of the light distributing elements 210, 212, and 214 and the outcoupling optical elements 222, 224, 226 are combined in a combined pupil expander as discussed in relation to FIG. 2E.

Accordingly, with reference to FIGS. 2A and 2B, in some embodiments, the set 200 of waveguides includes waveguides 202, 204, 206, incoupling optical elements 203, 205, 207, light distributing elements 210 (e.g., OPEs), 212, 214, and outcoupling optical elements (e.g., EPs) 222, 224, 226 for each component color. The waveguides 202, 204, 206 may be stacked with an air gap/cladding layer between each one. The incoupling optical elements 203, 205, 207 redirect or deflect incident light (with different incoupling optical elements receiving light of different wavelengths) into its waveguide. The light then propagates at an angle which will result in TIR within the respective waveguide 202, 204, 206. In the example shown, light ray 218 (e.g., blue light) is deflected by the first incoupling optical element 203, and then continues to bounce down the waveguide, interacting with the light distributing elements 210 (e.g., OPEs) and then the outcoupling optical element (e.g., EPs) 222, in a manner described earlier. The light rays 219 and 220 (e.g., green and red light, respectively) will pass through the waveguide 202, with light ray 219 impinging on and being deflected by incoupling optical element 205. The light ray 219 then bounces down the waveguide 204 via TIR, proceeding on to its light distributing element (e.g., OPEs) 212 and then the outcoupling optical element (e.g., EPs) 224. Finally, light ray 220 (e.g., red light) passes through the waveguide 206 to impinge on the light incoupling optical elements 207 of the waveguide 206. The light incoupling optical elements 207 deflect the light ray 220 such that the light ray propagates to light distributing element (e.g., OPEs) 214 by TIR, and then to the outcoupling optical element (e.g., EPs) 226 by TIR. The outcoupling optical element 226 then finally out-couples the light ray 220 to the viewer, who also receives the outcoupled light from the other waveguides 202, 204.

Figure 2C:
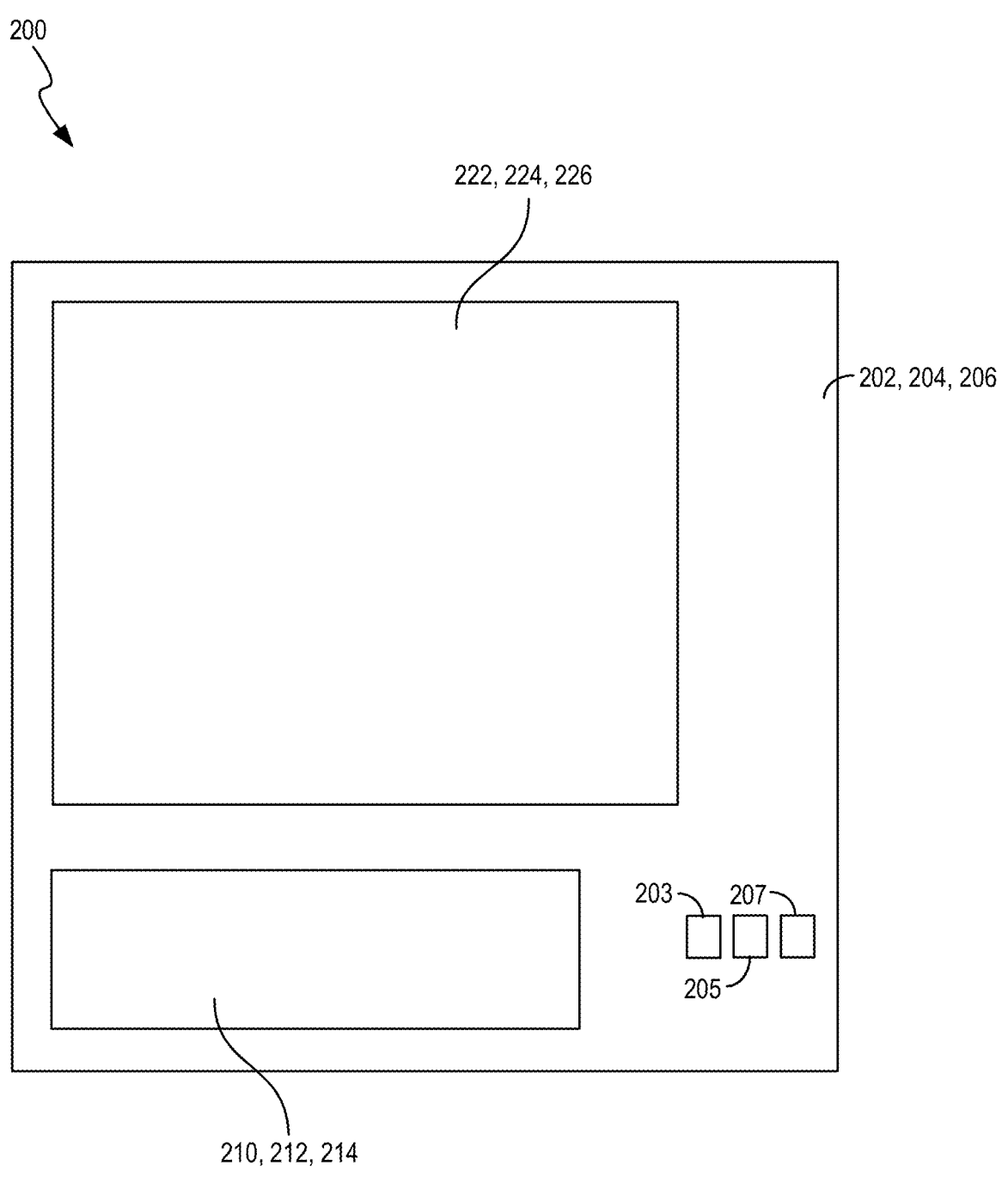
FIG. 2C illustrates a top-down, plan view of an example of the one or more stacked waveguides of FIGS. 2A and 2B.

FIG. 2C illustrates a top-down, plan view of an example of the one or more stacked waveguides of FIGS. 2A and 2B. As illustrated, the waveguides 202, 204, 206, along with each waveguide's associated light distributing element 210, 212, 214 and associated outcoupling optical element 222, 224, 226, may be vertically aligned. However, as discussed herein, the incoupling optical elements 203, 205, 207 are not vertically aligned; rather, the incoupling optical elements are preferably nonoverlapping (e.g., laterally spaced apart as seen in the top-down or plan view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially separated incoupling optical elements may be referred to as a shifted pupil system, and the incoupling optical elements within these arrangements may correspond to sub pupils.

Figure 2D:
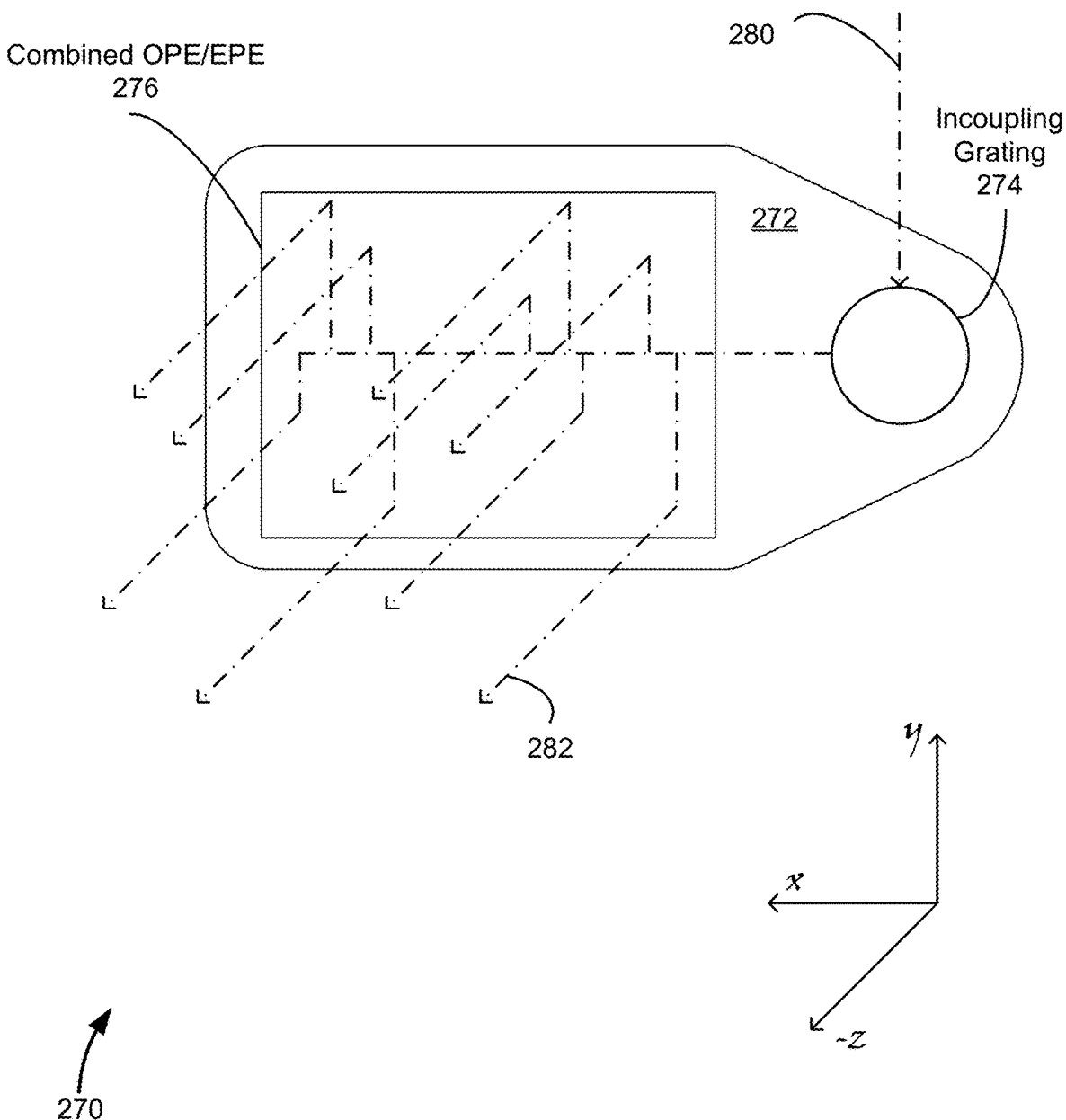
FIG. 2D is a simplified illustration of an eyepiece waveguide having a combined pupil expander according to an embodiment of the present invention.

FIG. 2D is a simplified illustration of an eyepiece waveguide having a combined pupil expander according to an embodiment of the present invention. In the example illustrated in FIG. 2D, the eyepiece 270 utilizes a combined OPE/EPE region in a single-side configuration. Referring to FIG. 2D, the eyepiece 270 includes a substrate 272 in which incoupling optical element 274 and a combined OPE/EPE region 276, also referred to as a combined pupil expander (CPE), are provided. Incident light ray 280 is incoupled via the incoupling optical element 274 and outcoupled as output light rays 282 via the combined OPE/EPE region 276.

The combined OPE/EPE region 276 includes gratings corresponding to both an OPE and an EPE that spatially overlap in the x-direction and the y-direction. In some embodiments, the gratings corresponding to both the OPE and the EPE are located on the same side of a substrate 272 such that either the OPE gratings are superimposed onto the EPE gratings or the EPE gratings are superimposed onto the OPE gratings (or both). In other embodiments, the OPE gratings are located on the opposite side of the substrate 272 from the EPE gratings such that the gratings spatially overlap in the x-direction and the y-direction but are separated from each other in the z-direction (e.g., in different planes). Thus, the combined OPE/EPE region 276 can be implemented in either a single-sided configuration or in a two-sided configuration.

Figure 2E:
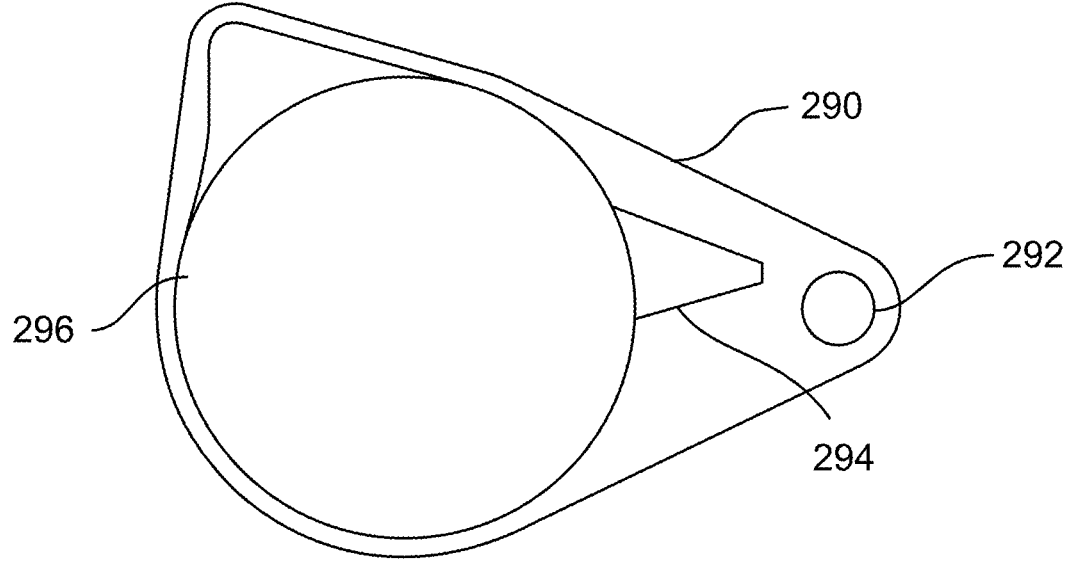
FIG. 2E is a simplified plan view of an eyepiece according to an embodiment of the present invention.
Figure 9:
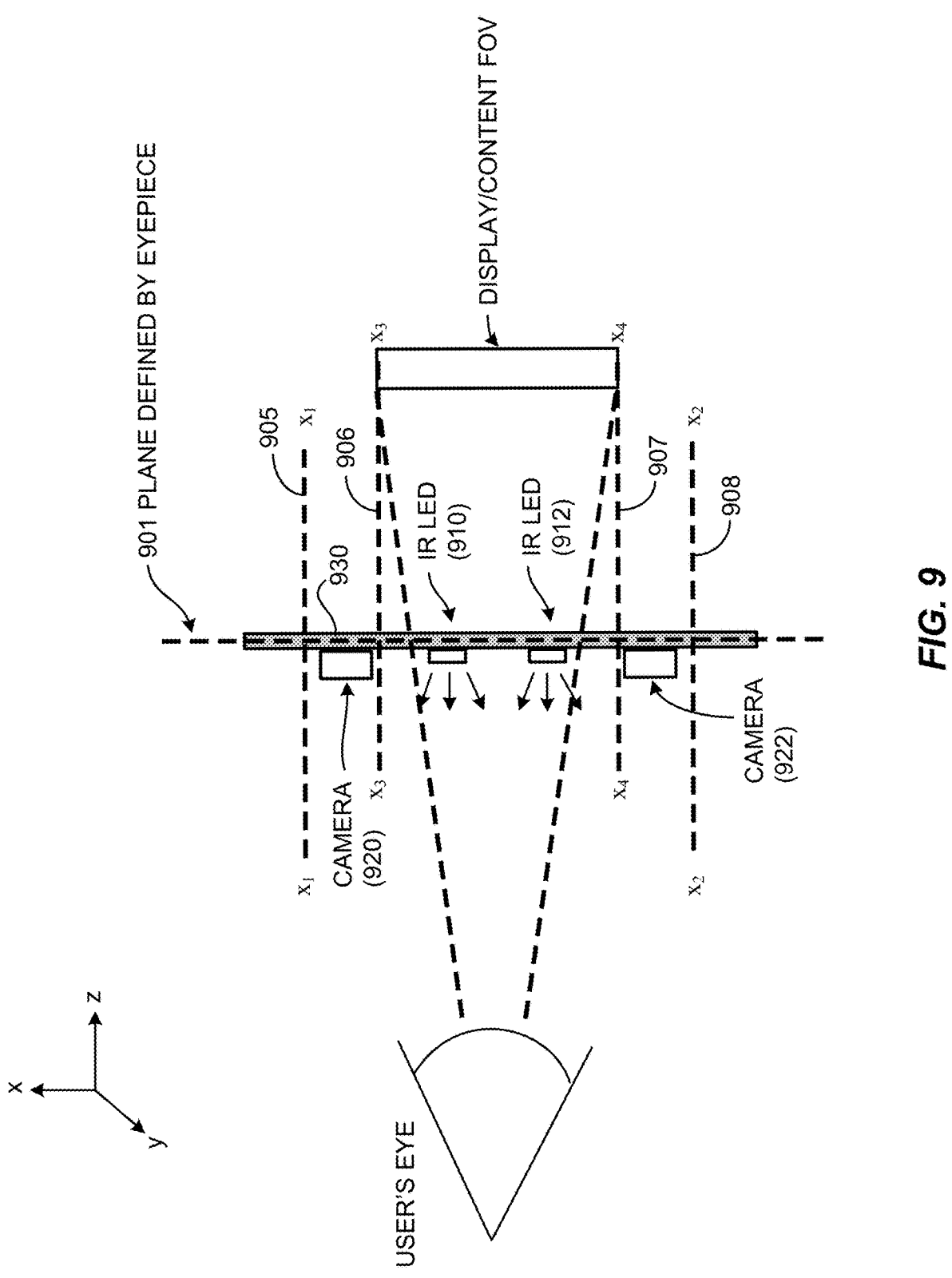
FIG. 9 is a simplified schematic diagram illustrating a top view of elements of an eye tracking system for an augmented reality display according to an embodiment of the present invention.

FIG. 2E is a simplified plan view of an eyepiece according to an embodiment of the present invention. As illustrated, eyepiece 290 is a multi-layer structure with layers parallel to the figure. In some embodiments, the multi-layer structure may be the set 200 of stacked waveguides as described in FIGS. 2A, 2B, 2C, and 2D. The eyepiece 290 includes incoupling diffractive optical element (DOE) 292, for example, an incoupling grating, orthogonal pupil expander (OPE) 294, and output region 296 of the eyepiece. The output region 296 of the eyepiece 290 can be implemented as either an exit pupil expander (EPE) or a combined pupil expander (CPE) that includes both an OPE and an EPE. The output region 296 of the eyepiece has a perimeter, which in the embodiment illustrated in FIG. 2E is a circular perimeter and can be referred to as an active area since virtual content is produced in the output region 296. This perimeter defines a base of a cylinder extending away from the plane of the figure with lines 905 and 908 in FIG. 9 lying in the sides of the cylinder. Thus, referring to FIG. 2E, the diameter of the output region of the eyepiece extends between line 905 and line 908 of FIG. 9. As illustrated in FIG. 9, the eye tracking illumination sources (e.g., 910 and 912) and the cameras (e.g., 920 and 922) may be located within the cylinder.

Figure 2F:
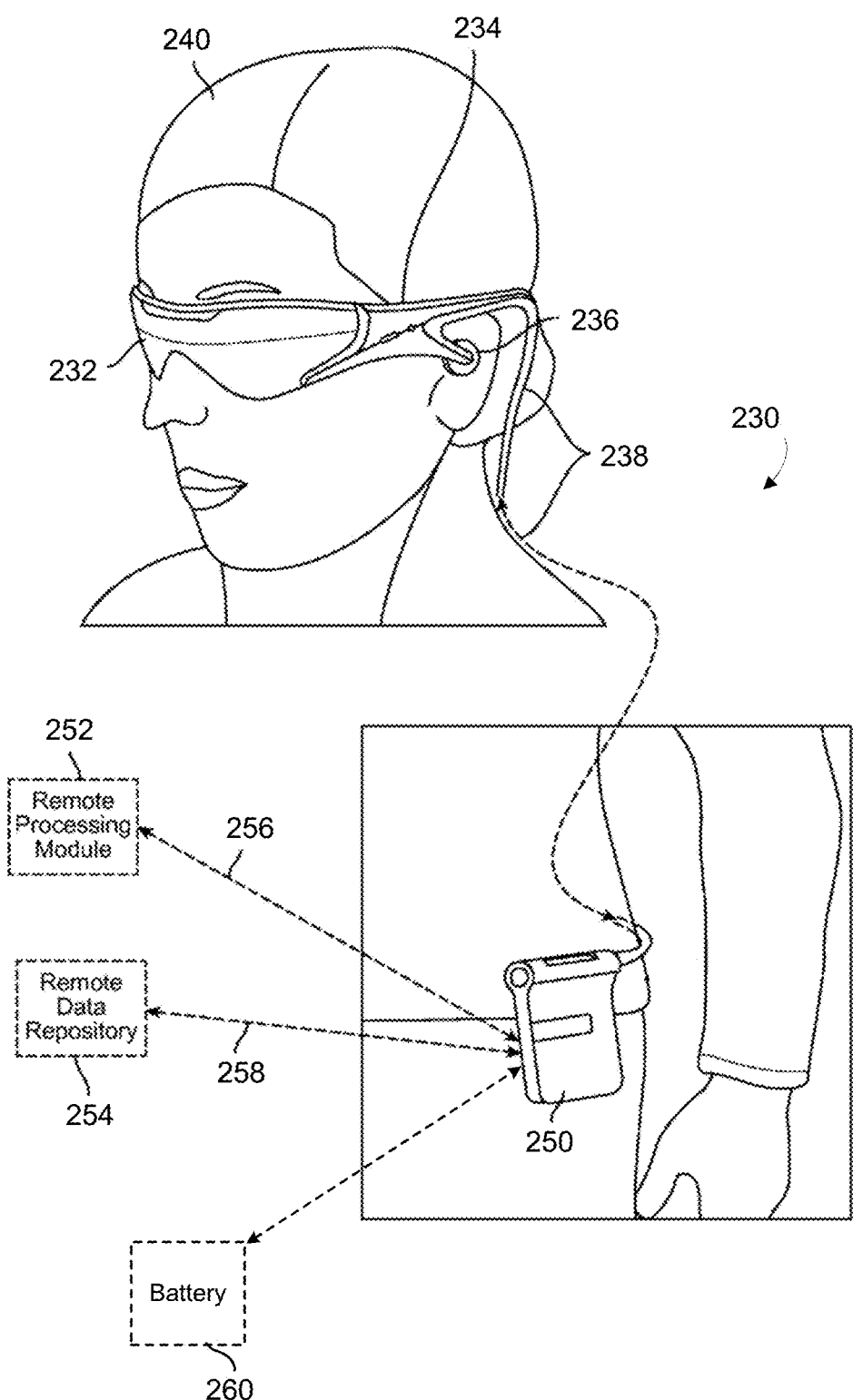
FIG. 2F illustrates an example of wearable display system according to an embodiment of the present invention.

FIG. 2F illustrates an example of wearable display system according to an embodiment of the present invention. With reference to FIG. 2F, the display system 230 includes a display 232, and various mechanical and electronic modules and systems to support the functioning of the display 232. The display 232 may be coupled to a frame 234, which is wearable by a display system user 240 (also referred to as a viewer) and which is configured to position the display 232 in front of the eyes of the user 240. The display 232 may be considered eyewear in some embodiments. In some embodiments, a speaker 236 is coupled to the frame 234 and configured to be positioned adjacent the ear canal of the user 240 (in some embodiments, another speaker, not shown, may optionally be positioned adjacent the other ear canal of the user to provide stereo/shapeable sound control). The display system 230 may also include one or more microphones or other devices to detect sound. In some embodiments, the microphone is configured to allow the user to provide inputs or commands to the display system 230 (e.g., the selection of voice menu commands, natural language questions, etc.), and/or may allow audio communication with other persons (e.g., with other users of similar display systems). The microphone may further be configured as a peripheral sensor to collect audio data (e.g., sounds from the user and/or environment). In some embodiments, the display system 230 may further include one or more outwardly directed environmental sensors configured to detect objects, stimuli, people, animals, locations, or other aspects of the world around the user. For example, environmental sensors may include one or more cameras, which may be located, for example, facing outward so as to capture images similar to at least a portion of an ordinary field of view of the user 240. In some embodiments, the display system may also include a peripheral sensor, which may be separate from the frame 234 and attached to the body of the user 240 (e.g., on the head, torso, an extremity, etc. of the user 240). The peripheral sensor may be configured to acquire data characterizing a physiological state of the user 240 in some embodiments. For example, the sensor may be an electrode.

The display 232 is operatively coupled by a communications link, such as by a wired lead or wireless connectivity, to a local data processing module which may be mounted in a variety of configurations, such as fixedly attached to the frame 234, fixedly attached to a helmet or hat worn by the user, embedded in headphones, or otherwise removably attached to the user 240 (e.g., in a backpack-style configuration, in a belt-coupling style configuration). Similarly, the sensor may be operatively coupled by a communications link, e.g., a wired lead or wireless connectivity, to the local processor and data module. The local processing and data module may comprise a hardware processor, as well as digital memory, such as non-volatile memory (e.g., flash memory or hard disk drives), both of which may be utilized to assist in the processing, caching, and storage of data. Optionally, the local processor and data module may include one or more central processing units (CPUs), graphics processing units (GPUs), dedicated processing hardware, and so on. The data may include data a) captured from sensors (which may be, e.g., operatively coupled to the frame 234 or otherwise attached to the user 240), such as image capture devices (such as cameras), microphones, inertial measurement units, accelerometers, compasses, GPS units, radio devices, gyros, and/or other sensors disclosed herein; and/or b) acquired and/or processed using remote processing module 252 and/or remote data repository 254 (including data relating to virtual content), possibly for passage to the display 232 after such processing or retrieval. The local processing and data module may be operatively coupled by communication links 238 such as via wired or wireless communication links, to the remote processing and data module 250, which can include the remote processing module 252, the remote data repository 254, and a battery 260. The remote processing module 252 and the remote data repository 254 can be coupled by communication links 256 and 258 to remote processing and data module 250 such that these remote modules are operatively coupled to each other and available as resources to the remote processing and data module 250. In some embodiments, the remote processing and data module 250 may include one or more of the image capture devices, microphones, inertial measurement units, accelerometers, compasses, GPS units, radio devices, and/or gyros. In some other embodiments, one or more of these sensors may be attached to the frame 234, or may be standalone structures that communicate with the remote processing and data module 250 by wired or wireless communication pathways.

With continued reference to FIG. 2F, in some embodiments, the remote processing and data module 250 may comprise one or more processors configured to analyze and process data and/or image information, for instance including one or more central processing units (CPUs), graphics processing units (GPUs), dedicated processing hardware, and so on. In some embodiments, the remote data repository 254 may comprise a digital data storage facility, which may be available through the internet or other networking configuration in a "cloud" resource configuration. In some embodiments, the remote data repository 254 may include one or more remote servers, which provide information, e.g., information for generating augmented reality content, to the local processing and data module and/or the remote processing and data module 250. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, the illustrated modules, for instance, via wireless or wired connections.

Figure 3:
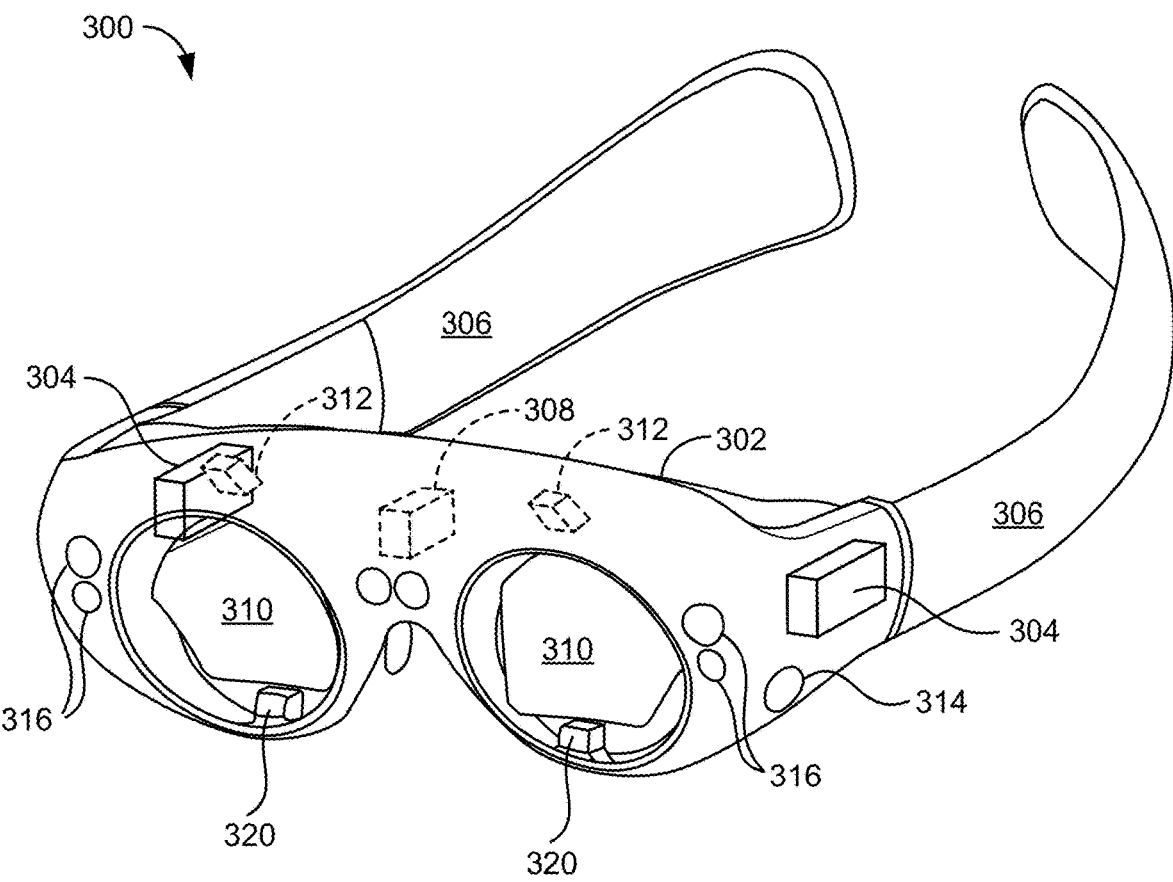
FIG. 3 shows a perspective view of a wearable device according to an embodiment of the present invention.

FIG. 3 shows a perspective view of a wearable device according to an embodiment of the present invention. Wearable device 300 includes a frame 302 configured to support one or more projectors 304 at various positions along an interior-facing surface of frame 302, as illustrated. In some embodiments, projectors 304 can be attached at positions near temples 306. Alternatively, or in addition, another projector could be placed in position 308. Such projectors may, for instance, include or operate in conjunction with one or more liquid crystal on silicon (LCoS) modules, micro-LED displays, or fiber scanning devices. In some embodiments, light from projectors 304 or projectors disposed in positions 308 could be guided into eyepieces 310 for display to eyes of a user. Projectors placed at positions 312 can be somewhat smaller on account of the close proximity this gives the projectors to the waveguide system. The closer proximity can reduce the amount of light lost as the waveguide system guides light from the projectors to eyepiece 310. In some embodiments, the projectors at positions 312 can be utilized in conjunction with projectors 304 or projectors disposed in positions 308. While not depicted, in some embodiments, projectors could also be located at positions beneath eyepieces 310. Wearable device 300 is also depicted including sensors 314 and 316. Sensors 314 and 316 can take the form of forward-facing and lateral-facing optical sensors configured to characterize the real-world environment surrounding the wearable device 300. Wearable device 300 is also depicted including eye tracking camera 320. Eye tracking camera 320 captures images that include the eye as well as reflected light produced by eye tracking illumination sources (not shown) after reflection from the user's eye.

Figure 4:
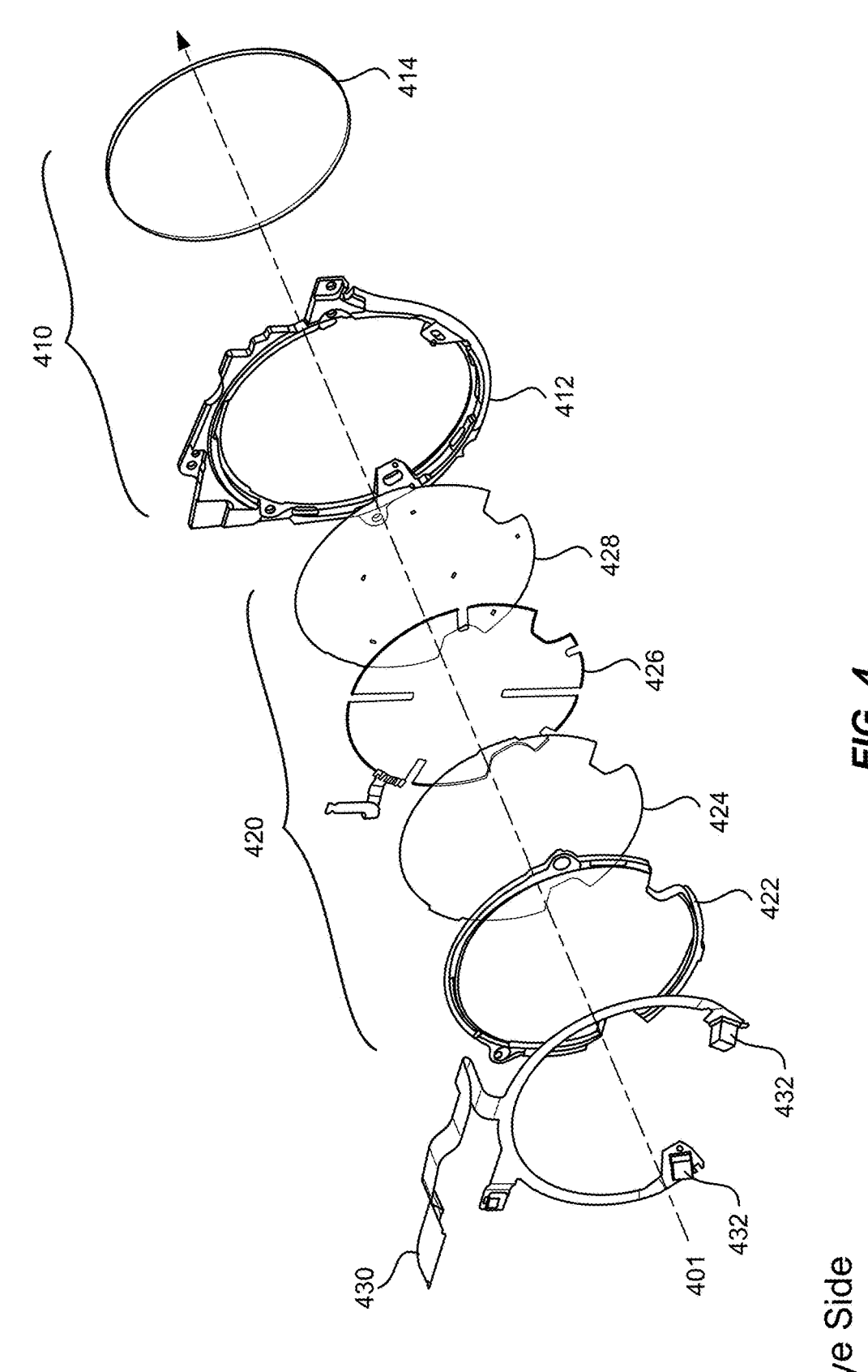
FIG. 4 is an exploded perspective view of elements of an eye tracking system for an augmented reality display according to an embodiment of the present invention.

FIG. 4 is an exploded perspective view of elements of an eye tracking system for an augmented reality display according to an embodiment of the present invention. Viewable optics assembly 400 includes a rear portion 410, a merged illumination and refractive layer (MILR) structure 420, and a camera flex cable 430. The rear portion 410 may include a rear carrier 412 and define a virtual content output region 414 of an eyepiece. In some embodiments, the eyepiece may be the eyepiece 290 as illustrated in FIG. 2E. In some embodiments, spacers or spacing components (not shown) may be disposed between the rear carrier 412 and the eyepiece (not shown). The spacers or spacing components may space a front Extended Depth Of Field (EDOF) lens a predetermined distance from the rear carrier 412. The rear carrier 412 may be any material as deemed appropriate. In some embodiments, the rear carrier is magnesium.

As illustrated in FIG. 4, the MILR structure 420 may have a combined structure that includes an optical element 422, a substrate 424, an illumination structure 426, and a passivation coating 428 applied on the illumination structure 426 along an axis 401. The optical element 422 (e.g., the rear EDOF lens) may include a front (e.g., a world side) planar surface and the substrate 424 can be bonded to the front planar surface of the optical element 422. In some embodiments, the substrate 424 may be a polyethylene terephthalate (PET) film. The illumination structure 426 may include eye tracking illumination sources (e.g., infrared LEDs), metal traces and a flex cable surrounding the illumination structure 426 and in electrical communications with the eye tracking illumination sources. The MILR structure 420 implemented in this laminated form thus includes the illumination structure 426, which includes the eye tracking illumination sources, as well as the optical element 422. Light emitted from the eye tracking illumination sources in the illumination structure 426 passes through optical element 422 before reflecting from the eye of the user.

The optical element 422 may have an optical power and can also be referred to as an EDOF refractive element since it moves the virtual content plane a predetermined distance away from the user's eye, thereby extending the depth of field. In some embodiments, optical element 422 may move the virtual content by a distance on the order of tens of centimeters. In the embodiment illustrated in FIG. 4, the optical element 422 has negative optical power, i.e., it is a negative lens that diverges collimated light received from the eyepiece. Although not shown in FIG. 4, a corresponding front EDOF lens with the opposite optical power (e.g., positive optical power) may be positioned on the world side of the eyepiece in order to counteract the action of optical element 422 with respect to world light.

The illumination structure 426 may be fabricated by a lamination process. In the lamination process, the substrate 424 (e.g., a PET film substrate) is provided and metal traces (e.g., copper traces) and contact pads may be deposited on the substrate 424. The eye tracking illumination sources (e.g., infrared LEDs) may be mounted and electrically connected to the contact pads. Subsequently, the passivation coating 428 may be applied upon the illumination structure 426. In some embodiments, the passivation coating 428 may be applied by a roll-to-roll process. The substrate 424, the illumination structure 426, and the passivation coating 428 may form a combined structure. The combined structure may then be bonded to the front (e.g., a world side) planar surface of the optical element 422 (e.g., the rear EDOF lens). Accordingly, the eye tracking illumination sources are positioned on the world side of the optical element 422 (e.g., rear EDOF lens) opposite the user's eye and propagate through the rear EDOF lens before reflection from the user's eye.

Although in FIG. 4 the eye tracking illumination sources are illustrated as infrared (IR) LEDs that are laminated to the substrate 424 (e.g., PET film substrate) and emit light toward the eye side, the MILR structure 420 may have other configurations as desired. In other embodiments, the eye tracking illumination sources may be disposed at locations peripheral to the metal traces of the illumination structure 426, and a waveguiding layer may be utilized in the plane in which the metal traces are disposed. In these embodiments, light from the eye tracking illumination sources propagates in the plane of the waveguiding layer and is outcoupled to provide the eye tracking illumination. The light can be outcoupled using reflective structures, for example, a mirrored surface tilted at ~45° to the plane of the waveguiding layer, or diffractive structures, for example, vertical outcoupling gratings disposed in or on the plane of the waveguiding layer. Thus, the IR LEDs illustrated in FIG. 4 can be replaced with illumination regions in which eye tracking illumination is output and directed toward the user's eye. One of ordinary skill in the art would recognize many variations, modifications, and alternatives. Additional information related to waveguiding layers is provided in U.S. Pat. No. 11,106,033 and International Patent Application No. PCT/US22/71988, the disclosures of which are hereby incorporated by reference in their entirety for all purposes.

In some embodiments, a set of cameras 432 may be disposed on the camera flex cable 430 to detect illumination light reflected from the eye. The camera flex cable 430 and the set of cameras 432 may be disposed on the eye side of optical element 422. In some embodiments, the set of cameras 432 may be incorporated into a wearable device similar to the manner in which the eye tracking camera 320 is incorporated into the wearable device 300 illustrated in FIG. 3.

Figure 5:
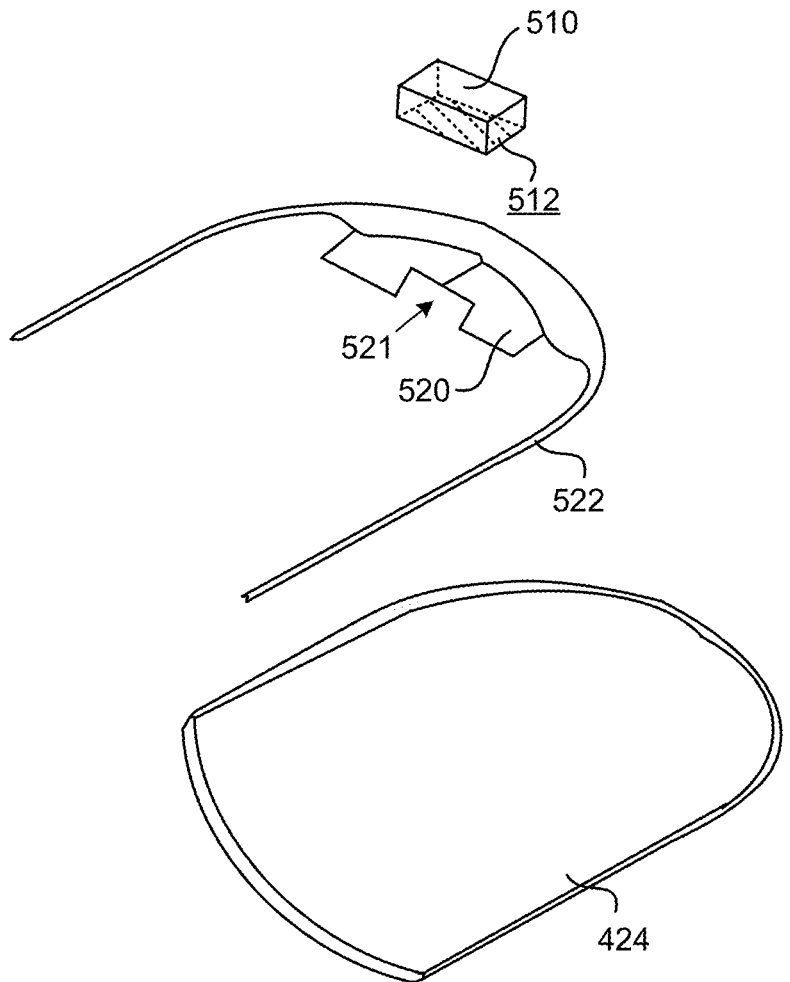
FIG. 5 is an exploded perspective view of an eye tracking illumination source and corresponding contacts according to an embodiment of the present invention.

FIG. 5 is an exploded perspective view of an eye tracking illumination source and corresponding contacts according to an embodiment of the present invention. As illustrated in FIG. 5, an eye tracking illumination source 510 may be mounted to contacts 520 such that an emission surface 512 of the eye tracking illumination source 510 faces the substrate 424. The eye tracking illumination source 510 may be powered by metal traces 522. In some embodiments, the contacts 520 may block light emitted from the eye tracking illumination source 510 and the emitted light only propagates through a contact gap 521 toward the substrate 424. In some embodiments, the eye tracking illumination source 510 may be a flip-chip IR LED. The substrate 424 may be a PET film substrate. The metal traces 522 may be copper traces. The contacts 520 may be in electrical communication with the eye tracking illumination source 510. In some embodiments, the contacts 520 may be disposed on the substrate 424 and can be positioned between the eye tracking illumination source 510 and the optical element 422 illustrated in FIG. 4 on the eye side of the MILR structure 420. Accordingly, the eye tracking illumination source 510 can be mounted on the contacts 520 on the substrate 424. Thus, light emitted by the eye tracking illumination source 510 passes through the substrate 424 before being incident on the user's eye. The eye tracking illumination source 510 and the contacts 520 may be located in the user's field of view. The eye tracking illumination source 510 and the contacts 520 may be small enough and placed close enough to the eye that they are not perceived by the user and, therefore, do not impair the user experience. In some embodiments, eye tracking illumination source 510 may have dimensions on the order of several hundred microns (e.g., 200 μm×300 μm). The metal traces 522 may have dimensions on the order of several microns. In some embodiments, the metal traces 522 may be copper traces having a width on the order of 15 μm.

Figure 6:
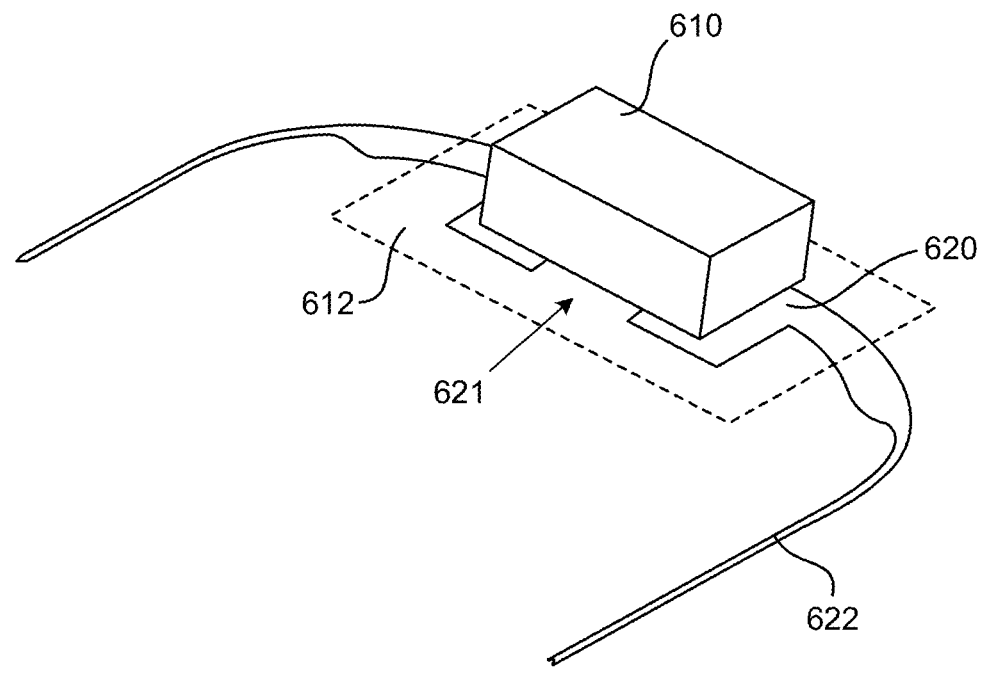
FIG. 6 is a simplified perspective view of an illumination source and corresponding contacts according to an embodiment of the present invention.

FIG. 6 is a simplified perspective view of an illumination source and corresponding contacts according to an embodiment of the present invention. The perspective view shown in FIG. 6 is a view from the world side of the MILR structure 420 illustrated in FIG. 4 without the passivation coating 428 illustrated in FIG. 4. Similar to the eye tracking illumination source 510 illustrated in FIG. 5, an eye tracking illumination source 610 may be mounted to contacts 620 such that an emission surface 612 of the eye tracking illumination source 610 faces a substrate of the MILR structure (e.g., substrate 424 illustrated in FIG. 4). The eye tracking illumination source 610 may be powered by metal traces 622. In some embodiments, the contacts 620 may block light emitted from the eye tracking illumination source 610 and the emitted light propagates through a contact gap 621 toward the substrate (e.g., substrate 424 illustrated in FIG. 4). In some embodiments, the eye tracking illumination source 610 may be a flip-chip IR LED. The substrate (e.g., substrate 424 illustrated in FIG. 4) may be a PET film substrate. The metal traces 622 may be copper traces. Accordingly, in some embodiments, the IR LEDs are mounted on the contacts on the PET film substrate and light emitted by the IR LEDs passes through the substrate before being incident on the user's eye.

Figure 7:
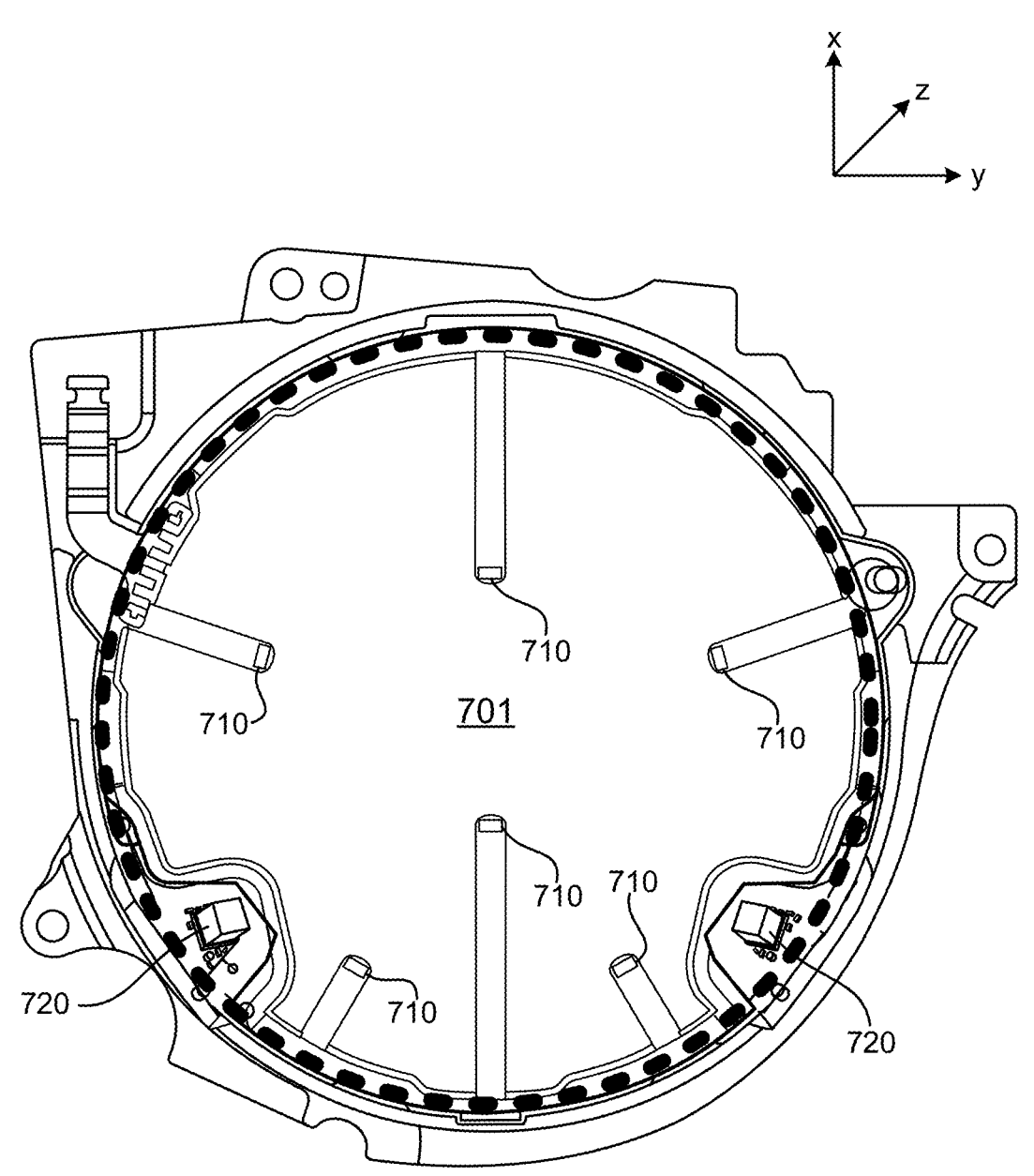
FIG. 7 is a simplified plan view of an augmented reality display indicating the perimeter of the output region of the eyepiece according to an embodiment of the present invention.

FIG. 7 is a simplified plan view of an augmented reality display indicating the perimeter of the output region of the eyepiece according to an embodiment of the present invention. As illustrated in FIG. 7, the output region 701 of the eyepiece is indicated by a circle in dashed line. The output region 701, which can be implemented as an EPE or a CPE and defines the portion of the eyepiece at which virtual content can be produced, has a circular geometry in this embodiment and substantially covers or overlaps with the entire aperture of the rear carrier (e.g., rear carrier 412 in FIG. 4). In some embodiments, the world light passes through the eyepiece, including the output region, and the virtual content is produced in the output region.

The eye tracking illumination sources 710 as well as the cameras 720 (e.g., cameras 432 in FIG. 4) are positioned within the periphery of the output region of the eyepiece when the output region of the eyepiece is viewed orthogonal to the plane of the eyepiece (e.g., the x-y plane). In some embodiments, the field of view of the augmented reality display may be a fraction of the output region 701. In some embodiments, the field of view may be as large as the output region 701.

FIG. 8 is a simplified plan view of an augmented reality display indicating the perimeter of the MILR structure of the eyepiece according to an embodiment of the present invention. As illustrated in FIG. 8, the output region 801 of the eyepiece is indicated by a circle in solid line. The perimeter 802 of the MILR structure of the eyepiece is indicated by a geometry in dashed line. As illustrated in FIG. 8, the MILR structure includes cutouts 804 at which cameras 820 can be disposed. The cameras 820 can capture images that include the user's eye as well as reflected light produced by the eye tracking illumination sources 810 after reflection from the user's eye.

The eye tracking illumination sources 810, as well as the cameras 820 (e.g., cameras 432 in FIG. 4) are positioned within the periphery of the output region 801 of the eyepiece when the output region 801 of the eyepiece is viewed orthogonal to the plane of the eyepiece (e.g., the x-y plane). In some embodiments, the field of view of the augmented reality display may be a fraction of the output region 801. In some embodiments, the field of view may be as large as the output region 801.

FIG. 9 is a simplified schematic diagram illustrating a top view of elements of an eye tracking system for an augmented reality display according to an embodiment of the present invention. As shown in FIG. 9, both the cameras 920 and 922 and the eye tracking illumination sources 910 and 912 (e.g., IR LEDs as illustrated in FIG. 9) are positioned with respect to the eyepiece such that they are between the lines (e.g., line 905 and line 908) that extend from the eyepiece plane 901 and are perpendicular to the eyepiece plane 901 (e.g., the x-y plane illustrated in FIGS. 7 and 8) at the periphery of the eyepiece. Referring to FIG. 9, line 905 and line 908 characterized by $x_1$ and $x_2$, respectively, intersect the eyepiece at the edges of an output region 930 (e.g., the output region 701 and 801 of the eyepiece illustrated in FIGS. 7 and 8, respectively) of the eyepiece and thus define the range of the output region 930. The edges of the output region 930 may be determined by the disposition of the MILR structure (e.g., the edges may depend on the perimeter 802 of the MILR structure as illustrated in FIG. 8). The output region 930 can be an exit pupil expander (EPE) or a combined pupil expander (CPE), and are perpendicular to the eyepiece plane 901 (e.g., the x-y plane illustrated in FIGS. 7 and 8). The output region 930 defines the portion of the eyepiece at which virtual content can be produced. In some embodiments, the world light also passes through the eyepiece, including the output region 930, and the virtual content is produced in the output region 930.

The cameras 920 and 922 and the eye tracking illumination sources 910 and 912 are located between line 905 and line 908 in a geometry in which the eye tracking illumination sources 910 and 912 are located within the periphery of the eyepiece when viewed from the direction of the user (e.g., the eye tracking illumination sources 910 and 912 may overlap with the output region 930 of the eyepiece). The locations of cameras 920 and 922 may be characterized by $x_{c-1}$ and $x_{c-2}$. As discussed above, cameras 920 and 922 are located between line 905 and line 908 that are respectively characterized by $x_1$ and $x_2$. Thus, the overlapping relationship between the cameras 920 and 922 and the output region 930 may be described as $x_2 < x_{c-1}$ and $x_{c-2} < x_1$. The locations of the eye tracking illumination sources 910 and 912 may be characterized by $x_{i-1}$ and $x_{i-2}$. As discussed above, the eye tracking illumination sources 910 and 912 are located between line 905 and line 908 that are respectively characterized by $x_1$ and $x_2$. Thus, the overlapping relationship between the eye tracking illumination sources 910 and 912 and the output region 930 may be described as $x_2 < x_{i-1}$ and $x_{i-2} < x_1$. Additionally, the eye tracking illumination sources 910 and 912 may overlap with the virtual content defined by line 906 and 907. As illustrated in FIG. 9, line 906 and line 907 characterized by $x_3$ and $x_4$, respectively, intersect the eyepiece at the edge of the virtual content field of view and are perpendicular to the eyepiece plane 901 (e.g., the x-z plane). Thus, the overlapping relationship between the eye tracking illumination sources 910 and 912 and the virtual content field of view may be expressed as $x_4 < x_{i-1}$ and $x_{i-2} < x_3$. Accordingly, as the eye tracking illumination sources 910 and 912 are located between lines 906 and 907 corresponding to the field of view of the virtual content generated by the output region 930 of the eyepiece, the eye tracking illumination sources 910 and 912 overlap with the output region 930 of the eyepiece that generates the virtual content in a manner in which the illumination sources overlap with the actual virtual content. Thus, as the eye tracking illumination sources 910 and 912 may simultaneously overlap with the output region 930 and the virtual content field of view, such overlapping relationship may be expressed as $x_2 < x_4 < x_{i-1}$ and $x_{i-2} < x_3 < x_1$.

Referring once again to FIG. 9, the eye tracking illumination sources 910 and 912 are positioned so that the light making up the virtual content exits the output region 930 of the eyepiece on all directions surrounding the eye tracking illumination sources 910 and 912 as this light propagates towards the user's eye. In other words, the eye tracking illumination sources 910 and 912 overlap with the virtual content being displayed to the user (e.g., $x_2 < x_4 < x_{i-1}$ and $x_{i-2} < x_3 < x_1$). The relationship between the eye tracking illumination sources 910 and 912 and the light making up the virtual content exits the output region 930 of the eyepiece is further described in FIG. 10.

Figure 10:
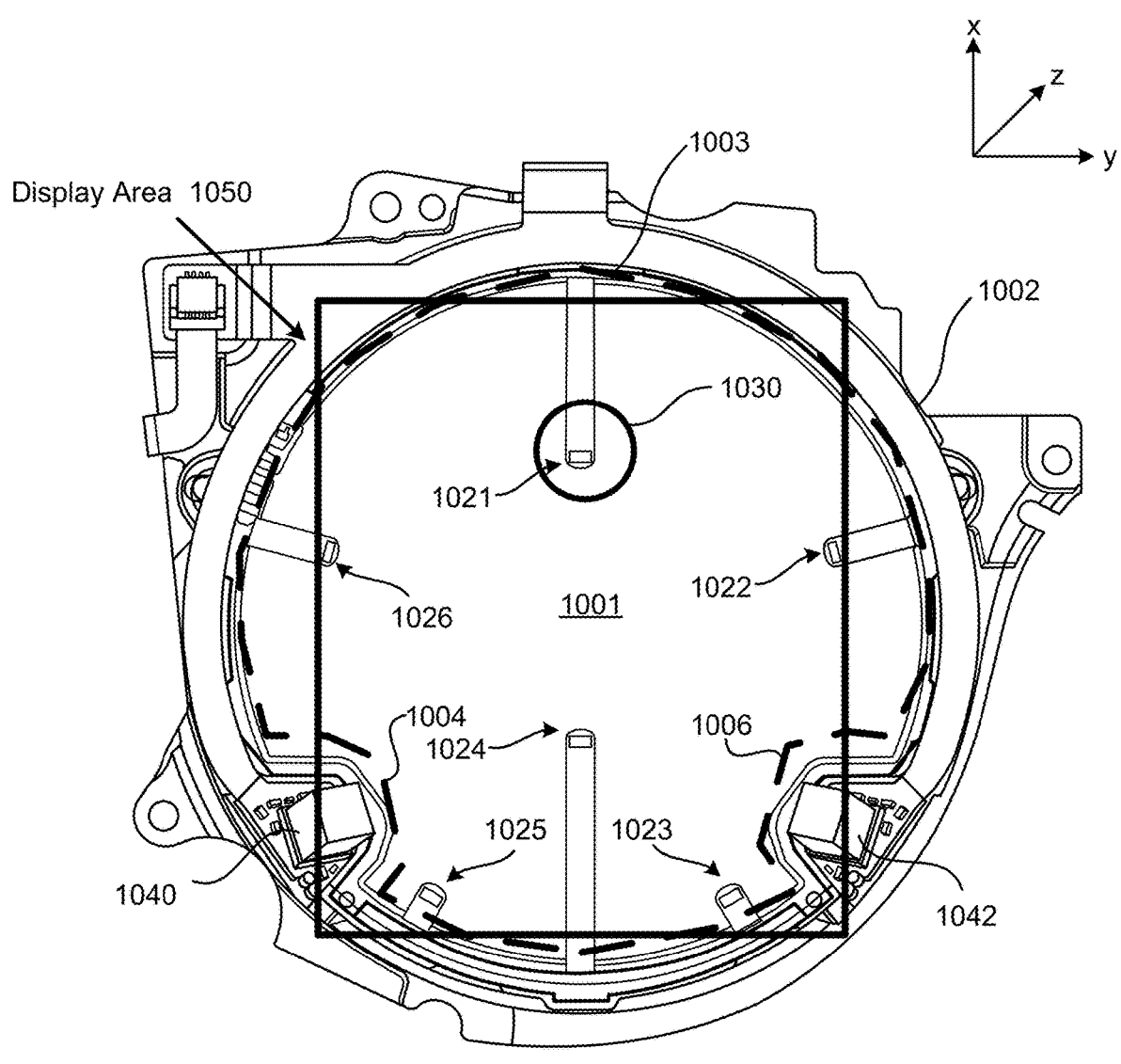
FIG. 10 is a simplified plan view of a plurality of illumination sources overlaid with an optical element of an eye tracking system for an augmented reality display according to an embodiment of the present invention.

FIG. 10 is a simplified plan view of a plurality of illumination sources overlaid with an optical element of an eye tracking system for an augmented reality display according to an embodiment of the present invention. The perimeter 1003 of the MILR structure 1002 indicated by a geometry in dashed line partially corresponds to the dimensions of the output region 701 and 801 of the eyepiece illustrated in FIGS. 7 and 8, respectively. As illustrated in FIG. 10, the MILR structure 1002 includes cutouts 1004 and 1006 for cameras 1040 and 1042, respectively.

As shown in FIG. 10, the eye tracking illumination sources 1021, 1022, 1023, 1024, 1025, and 1026 and cameras 1040 and 1042 are positioned so that they overlap with the MILR structure 1002 and the output region 1001 in a manner similar to the manner in which the eye tracking illumination sources 910 and 912 are positioned to overlap with the output region 930 and the virtual content field of view as illustrated in FIG. 9. Although FIG. 10 illustrates all of the eye tracking illumination sources 1021, 1022, 1023, 1024, 1025, and 1026 and both cameras 1040 and 1042 being positioned so that they overlap with the MILR structure 1002 and the output region 1001, this is not required and in other embodiments at least one of the eye tracking illumination sources and/or at least one of the cameras overlaps with the MILR structure 1002 and the output region 1001. As a result, the plurality of the eye tracking illumination sources are disposed in a plane (e.g., the plane of the figure) and virtual content passes through the plane at positions surrounding each of the plurality of the eye tracking illumination sources. For example, the positions surrounding each of the plurality of the eye tracking illumination sources can be disposed at substantially 360° with respect to each of the plurality of the eye tracking illumination sources, illustrated by circle 1030 surrounding the eye tracking illumination source 1021. Accordingly, virtual content is generated at positions surrounding the eye tracking illumination source 1021 and passes to the user at these positions surrounding the eye tracking illumination source 1021. This is also true for at least the eye tracking illumination source 1024 as well as others of the eye tracking illumination sources (e.g., 1022, 1023, 1025, and 1026).

The display area 1050 is also illustrated in FIG. 10 corresponding to the field of view with dimensions of 55° vertical×45° horizontal. The display area 1050 is indicated by a rectangle in solid line. The plurality of the eye tracking illumination sources (e.g., 1021, 1022, 1023, 1024, 1025, and 1026) are located inside both the display area 1050 and the MILR structure 1002 in the view illustrated in FIG. 10. It will be appreciated that in FIG. 10, the display area is associated with a plane behind the MILR structure 1002. As a result, as discussed in relation to FIG. 11, the display area will not be clipped by the rear carrier (e.g., rear carrier 412 in FIG. 4). Because the eye tracking illumination sources (e.g., 1021, 1022, 1023, 1024, 1025, and 1026) and the copper traces that provide power to the eye tracking illumination sources are located in the user's field of view, embodiments of the present invention utilize the eye tracking illumination sources and copper traces that are small enough and placed close enough to the eye that they are not perceived by the user and, therefore, do not impair the user experience.

Because virtual content propagates through the plane including the eye tracking illumination sources (e.g., the IR LEDs), the size of the eye tracking illumination sources is selected to provide the desired brightness, but not substantially degrade the user's view of the virtual content. As an example, the eye tracking illumination sources can be IR LEDs having dimensions on the order of several hundred microns, e.g., 200 μm×300 μm or the like and the copper traces providing electrical current to the eye tracking illumination sources can have a width on the order of 15 μm.

The inventors have determined that eye tracking performance is enhanced by positioning at least some of the eye tracking illumination sources closer to the optical axis than to the periphery of the output region of the eyepiece. Thus, positioning of at least some of the eye tracking illumination sources at locations in front of the eye rather than to the side of the eye improves eye tracking performance. As an example, given a cylinder with a diameter equal to the eye diameter of the user and projecting from the eye along the optical axis toward the output region of the eyepiece, one or more of the plurality of the eye tracking illumination sources are located within the cylinder, i.e., in front of the eye. In other implementations, at least some of the plurality of the eye tracking illumination sources are located within a cone having an apex positioned at the user's cornea and a base positioned at the output region of the eyepiece.

Figure 11:
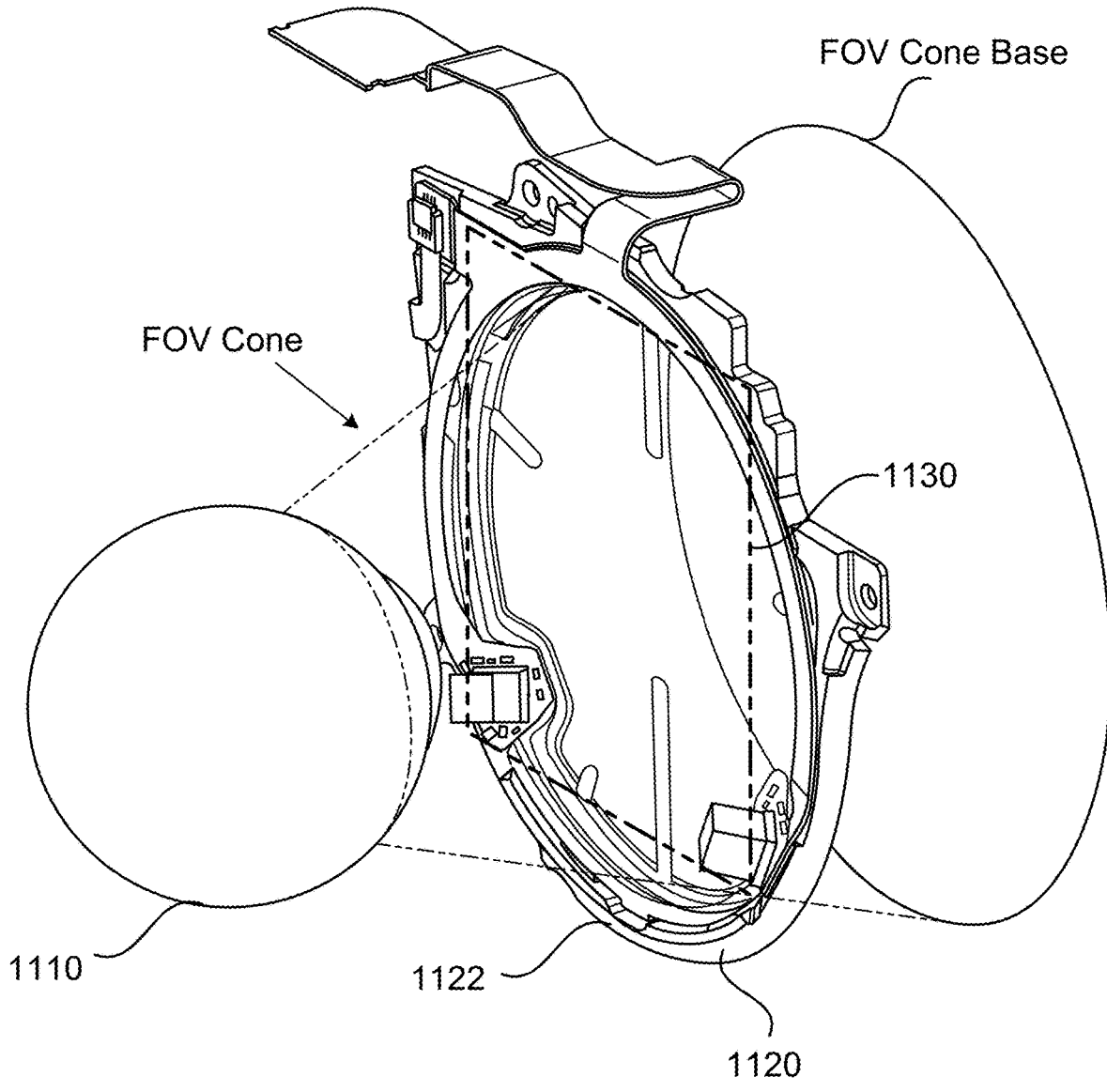
FIG. 11 is a simplified isometric view of a user's eye and elements of an eye tracking system for an augmented reality display according to an embodiment of the present invention.

FIG. 11 is a simplified isometric view of a user's eye and elements of an eye tracking system for an augmented reality display according to an embodiment of the present invention. As illustrated in FIG. 11, as the distance from the eye increases, the base of the cone defining the eye's FOV increases in area. For the short distance between the eye 1110 and the rear carrier assembly 1120 including the MILR structure 1122 shown in FIG. 11, the area of the base of the cone defining the eye's FOV is smaller than the area of the MILR structure 1122. Accordingly, if the display field of view ("FOV") 1130 is within the eye's FOV, the virtual content produced by the display will be viewable by the user.

FIG. 12 is a flowchart of a method of performing eye tracking according to an embodiment of the present invention. The method 1200 starts at block 1202 by generating illumination light using a plurality of eye tracking illumination sources. In some embodiments, the plurality of illumination sources may be infrared LEDs having dimensions on the order of several hundred microns (e.g., 200 μm×300 μm or the like). Referring to FIG. 4, the plurality of eye tracking illumination sources may be included in an illumination structure 426 of a MILR structure 420. As illustrated by FIG. 4, the illumination structure 426 may be fabricated by a lamination process. In the lamination process, the substrate 424 (e.g., a PET film substrate) is provided and metal traces (e.g., copper traces) and contact pads may be deposited on the substrate 424. The eye tracking illumination sources (e.g., infrared LEDs) may be mounted and electrically connected to the contact pads. Subsequently, the passivation coating 428 may be applied upon the illumination structure 426. In some embodiments, the passivation coating 428 may be applied by a roll-to-roll process. The substrate 424, the illumination structure 426, and the passivation coating 428 may form a combined structure. In some embodiments, the eye tracking illumination sources are positioned on the world side of an optical element 422 (e.g., rear EDOF lens) opposite the user's eye and propagate through the rear EDOF lens before reflection from the user's eye. The combined structure may then be bonded to the front (e.g., a world side) planar surface of the optical element 422 (e.g., the rear EDOF lens).

At block 1204, the method 1200 propagates the illumination light through a refractive lens. In some embodiments, the refractive lens may be the optical element 422 illustrated in FIG. 4. The refractive lens may have an optical power and can also be referred to as an EDOF refractive element since it moves the virtual content plane a predetermined distance away from the user's eye, thereby extending the depth of field. In some embodiments, the refractive lens (e.g., optical element 422) may move the virtual content by a distance on the order of tens of centimeters. In some embodiments, the refractive lens (e.g., optical element 422) may have negative optical power, i.e., it is a negative lens that diverges collimated light received from the eyepiece. Although not shown, a corresponding front EDOF lens with the opposite optical power (e.g., positive optical power) may be positioned on the world side of the eyepiece in order to counteract the action of the refractive lens (e.g., optical element 422) with respect to world light. In some embodiments, the plurality of eye tracking illumination sources are disposed on a side of the refractive lens opposing the user.

At block 1206, the method 1200 impinges the illumination light on an eye of a user. At block 1208, the method 1200 reflects reflected light from the eye of the user in response to the illumination light impinged on the eye of the user. At block 1210, the method 1200 detects the reflected light at a set of cameras. The set of cameras may be the eye tracking camera 320 that is incorporated into a wearable device similar to the manner in which the eye tracking camera 320 is incorporated into the wearable device 300 illustrated in FIG. 3. The eye tracking camera 320 captures images that include the eye as well as reflected light produced by eye tracking illumination sources (not shown) after reflection from the user's eye. In some embodiments, as illustrated by FIG. 4, the set of cameras (e.g., cameras 432) may be disposed on the camera flex cable 430 to detect illumination light reflected from the eye. The camera flex cable 430 and the set of cameras 432 may be disposed on the eye side of optical element 422.

At block 1212, the method 1200 outputs an eye tracking signal from each of the set of cameras. The eye tracking signal may be in any form as needed. At block 1214, the method 1200 tracks the eye based on the eye tracking signal from each of the set of cameras. In some embodiments, the method 1200 may further include producing virtual content from an output region of an eyepiece. In some embodiments, the output region of the eyepiece can be implemented as either an EPE or a CPE that includes both an OPE and an EPE. In some embodiments, the output region may be the output region 251, 701, and 801 of the eyepiece has a perimeter as illustrated in FIGS. 2E, 7 and 8. The output region may have a circular perimeter and can be referred to as an active area since virtual content is produced in the output region.

In some embodiments, the method 1200 may further include propagating the virtual content through a plane in which the plurality of eye tracking illumination sources are disposed. In some embodiments, the eye tracking illumination sources may be disposed as the eye tracking illumination sources 910 and 912 as illustrated in FIG. 9. Referring to FIG. 9, both the cameras 920 and 922 and the eye tracking illumination sources 910 and 912 (e.g., IR LEDs as illustrated in FIG. 9) are positioned with respect to the eyepiece such that they are between the lines that extend from the eyepiece plane 901 and are perpendicular to the eyepiece plane 901 (e.g., the x-y plane) at the periphery of the eyepiece. Referring to FIG. 9, line 905 and line 908 intersect the eyepiece at the edge of an output region 930 of the eyepiece, which can be an EPE or a CPE, and are perpendicular to the eyepiece plane 901 (e.g., the x-y plane). The output region 930 defines the portion of the eyepiece at which virtual content can be produced. In some embodiments, the virtual content propagates through the eyepiece plane 901 and the eye tracking illumination sources 910 and 912 are disposed on the eyepiece plane 901. In some embodiments, the world light also passes through the eyepiece, including the output region 930, and the virtual content is produced in the output region 930.

Cameras 920 and 922 and the eye tracking illumination sources 910 and 912 are located between line 905 and line 908 in a geometry in which the eye tracking illumination sources 910 and 912 are located within the periphery of the eyepiece when viewed from the direction of the user (e.g., the eye tracking illumination sources 910 and 912 may overlap with the output region 930 of the eyepiece). Additionally, the eye tracking illumination sources 910 and 912 may overlap with the virtual content. As illustrated in FIG. 9, line 906 and line 907 intersect the eyepiece at the edge of the virtual content field of view and are perpendicular to the eyepiece plane 901 (e.g., the x-y plane). Accordingly, as the eye tracking illumination sources 910 and 912 are located between lines 906 and 907 corresponding to the field of view of the virtual content generated by the output region 930 of the eyepiece, the eye tracking illumination sources 910 and 912 overlap with the output region 930 of the eyepiece that generates the virtual content in a manner in which the eye tracking illumination sources overlap with the actual virtual content.

Referring to FIG. 9, the eye tracking illumination sources 910 and 912 are positioned so that the light making up the virtual content exits the output region 930 of the eyepiece on all directions surrounding the eye tracking illumination sources 910 and 912 as this light propagates towards the user's eye. In other words, the eye tracking illumination sources 910 and 912 overlap with the virtual content being displayed to the user (e.g., $x_2 < x_4 < x_{i-1}$ and $x_{i-2} < x_3 < x_1$). The relationship between the eye tracking illumination sources 910 and 912 and the light making up the virtual content exits the output region 930 of the eyepiece is further described in FIG. 10.

In some embodiments, the method 1200 may further include impinging the virtual content on the eye of the user. In some embodiments, the virtual content may propagate through an eyepiece and impinge on the eye of the user by using a set of stacked waveguides as illustrated in FIGS. 2A-2D and/or an eyepiece as illustrated in FIG. 2E.

It should be appreciated that the specific steps illustrated in FIG. 12 provide a particular method of performing eye tracking according to an embodiment of the present invention. Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

Figure 13:
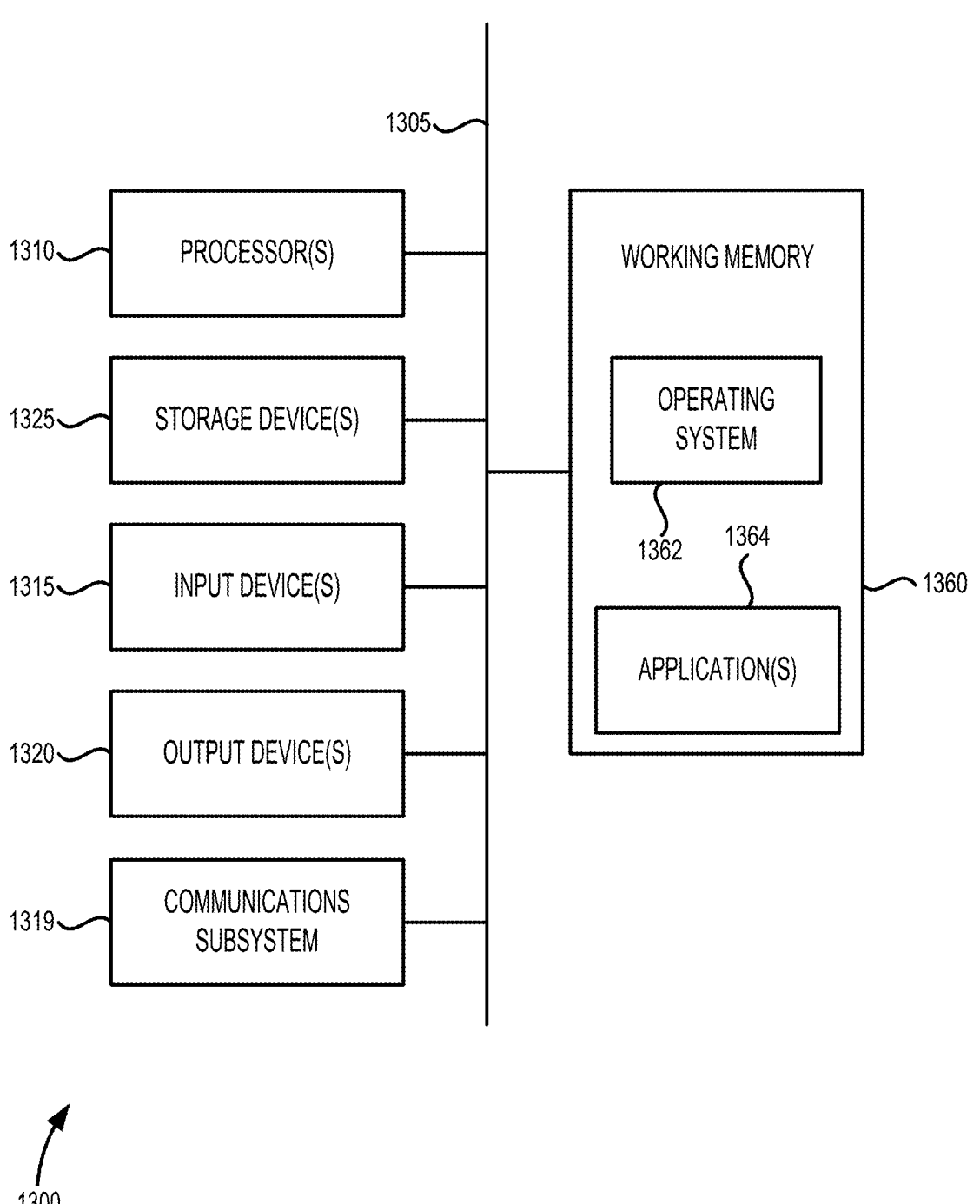
FIG. 13 is a simplified block diagram illustrating components of an AR system according to an embodiment of the present invention.

FIG. 13 is a simplified block diagram illustrating components of an AR system according to an embodiment of the present invention. Computer system 1300 as illustrated in FIG. 13 may be incorporated into the AR devices as described herein. FIG. 13 provides a schematic illustration of one embodiment of computer system 1300 that can perform some or all of the steps of the methods provided by various embodiments. It should be noted that FIG. 13 is meant only to provide a generalized illustration of various components, any or all of which may be utilized as appropriate. FIG. 13, therefore, broadly illustrates how individual system elements may be implemented in a relatively separated or relatively more integrated manner.

Computer system 1300 is shown comprising hardware elements that can be electrically coupled via a bus 1305, or may otherwise be in communication, as appropriate. The hardware elements may include one or more processors 1310, including without limitation one or more general-purpose processors and/or one or more special-purpose processors such as digital signal processing chips, graphics acceleration processors, and/or the like; one or more input devices 1315, which can include without limitation a mouse, a keyboard, a camera, and/or the like; and one or more output devices 1320, which can include without limitation a display device, a printer, and/or the like.

Computer system 1300 may further include and/or be in communication with one or more non-transitory storage devices 1325, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1300 might also include a communications subsystem 1319, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. Communications subsystem 1319 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via communications subsystem 1319. In other embodiments, a portable electronic device, e.g., the first electronic device, may be incorporated into computer system 1300, e.g., an electronic device as an input device 1315. In some embodiments, computer system 1300 will further comprise a working memory 1360, which can include a RAM or ROM device, as described above.

Computer system 1300 also can include software elements, shown as being currently located within working memory 1360, including an operating system 1362, device drivers, executable libraries, and/or other code, such as one or more application programs 1364, which may comprise computer programs provided by various embodiments, and/or may be designed to implement methods, and/or configure systems, provided by other embodiments, as described herein. Merely by way of example, one or more procedures described with respect to the methods discussed above might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as storage device(s) 1325 described above. In some cases, the storage medium might be incorporated within a computer system, such as computer system 1300. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1300 and/or might take the form of source and/or installable code, which, upon compilation and/or installation on computer system 1300, e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as computer system 1300 to perform methods in accordance with various embodiments of the technology. According to a set of embodiments, some or all of the procedures of such methods are performed by computer system 1300 in response to processor 1310 executing one or more sequences of one or more instructions, which might be incorporated into operating system 1362 and/or other code, such as an application program 1364, contained in working memory 1360. Such instructions may be read into working memory 1360 from another computer-readable medium, such as one or more of storage device(s) 1325. Merely by way of example, execution of the sequences of instructions contained in working memory 1360 might cause processor(s) 1310 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 1300, various computer-readable media might be involved in providing instructions/code to processor(s) 1310 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as storage device(s) 1325. Volatile media include, without limitation, dynamic memory, such as working memory 1360.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to processor(s) 1310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1300.

Communications subsystem 1319 and/or components thereof generally will receive signals, and bus 1305 then might carry the signals and/or the data, instructions, etc. carried by the signals to working memory 1360, from which processor(s) 1310 retrieves and executes the instructions. The instructions received by working memory 1360 may optionally be stored on a non-transitory storage device 1325 either before or after execution by processor(s) 1310.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An augmented reality display comprising:
a projector operable to generate virtual content characterized by a rectangular display area;
an eyepiece operable to output the virtual content from an output region;
a plurality of illumination sources, wherein at least some of the plurality of illumination sources overlap with the output region and are positioned within the rectangular display area; and
a set of cameras facing a user and positioned within a width and a height of the output region and the rectangular display area.

2. The augmented reality display of claim 1 wherein the eyepiece has a world side and an eye side opposing the world side and the plurality of illumination sources are disposed on the eye side of the eyepiece.

3. The augmented reality display of claim 2 wherein the set of cameras disposed on the eye side.

4. The augmented reality display of claim 3 wherein the set of cameras are positioned farther from the eyepiece than the plurality of illumination sources.

5. The augmented reality display of claim 3 further comprising a camera flex cable, wherein the set of cameras are disposed on the camera flex cable.

6. The augmented reality display of claim 1 wherein the output region is disposed in a plane orthogonal to an optical axis and a projection of each of the plurality of illumination sources parallel to the optical axis is located within the output region.

7. The augmented reality display of claim 6 wherein the plurality of illumination sources are positioned at three different radial distances from the optical axis.

8. The augmented reality display of claim 1 wherein the virtual content is output by a diffractive structure in the eyepiece defined by a boundary and the one or more of the plurality of illumination sources are located above the boundary of the diffractive structure in plan view.

9. The augmented reality display of claim 1 wherein the plurality of illumination sources are disposed in a plane and virtual content passes through the plane at positions surrounding each of the plurality of illumination sources.

10. The augmented reality display of claim 1 wherein the plurality of illumination sources comprise a set of infrared light emitting diodes.

11. The augmented reality display of claim 1 further comprising:
an optical element having optical power, wherein the plurality of illumination sources are disposed between the optical element and the eyepiece; and
wherein the optical element is disposed between the plurality of illumination sources and the set of cameras.

12. An eye tracking system including:
an eyepiece operable to output virtual content over an output region;
a plurality of illumination sources overlapping with the output region;
an optical element having optical power; and
a set of cameras facing a user and disposed within a width and a height of the output region, wherein the optical element is disposed between the plurality of illumination sources and the set of cameras.

13. The eye tracking system of claim 12 wherein the plurality of illumination sources comprises a set of infrared (IR) light emitting diodes (LEDs) disposed in a plane.

14. The eye tracking system of claim 12 wherein the plurality of illumination sources are disposed on a world side of the optical element.

15. The eye tracking system of claim 12 wherein the plurality of illumination sources are laminated between a substrate and a passivation coating.

16. The eye tracking system of claim 15 wherein the optical element comprises a planar surface and the substrate is bonded to the planar surface of the optical element.

17. The eye tracking system of claim 12 wherein the optical power is a negative optical power.

18. The eye tracking system of claim 12 wherein the set of cameras are adjacent to the user and virtual content passes through a plane in which the plurality of illumination sources are disposed and then through the optical element before viewing by the user.

19. The eye tracking system of claim 12 wherein light from the plurality of illumination sources is configured to propagate through the optical element before reaching the user.

20. The eye tracking system of claim 12 wherein each of the plurality of illumination sources are mounted with an emission surface facing the optical element, wherein electrical contacts for each of the plurality of illumination sources are disposed between each of the plurality of illumination sources and the optical element.

* * * * *